United States Patent [19]

Hashimoto

[11] Patent Number: 4,931,138
[45] Date of Patent: Jun. 5, 1990

[54] METHOD AND APPARATUS FOR MANUFACTURING OPTICAL CARD

[75] Inventor: Akihiko Hashimoto, Hachioji, Japan

[73] Assignee: Olympus Optical Co. Ltd., Japan

[21] Appl. No.: 291,239

[22] Filed: Dec. 29, 1988

[30] Foreign Application Priority Data

Jan. 12, 1988 [JP] Japan ................................ 63-3142
Feb. 25, 1988 [JP] Japan ............................... 63-40603
Aug. 16, 1988 [JP] Japan .............................. 63-202731
Aug. 20, 1988 [JP] Japan .............................. 63-205669

[51] Int. Cl.$^5$ .................... B44C 1/22; C23F 1/02; C03C 15/00; B29C 37/00
[52] U.S. Cl. ........................ 156/659.1; 156/656; 156/661.1; 156/345; 219/121.85; 430/321; 430/323; 430/945
[58] Field of Search ............ 156/656, 659.1, 661.1, 156/664, 345; 430/321, 323, 329, 945; 219/121.61, 121.85, 121.76, 121.78, 121.83

[56] References Cited

U.S. PATENT DOCUMENTS 3,944,357  3/1976  Wacks ................................ 355/5
4,552,614  11/1985 Beckett ........................ 156/640 X
4,552,829  11/1985 Masaki ...................... 156/659.1 X Primary Examiner—William A. Powell
Attorney, Agent, or Firm—Arnold, White & Durkee

[57] ABSTRACT

The invention relates to a method of recording a data signal on an optical card having a photosensitive layer applied on a metal layer. A number of light beams are emitted from a number of light sources such as semiconductor laser diodes and thin film electroluminescent elements, each light source being selectively driven in accordance with the data signal to be recorded. The light beams are simultaneously made incident upon the photosensitive layer via a projection optical system such as optical fibers and lenses, while the optical card is moved in a longitudinal direction of the optical card. The recording light beams are aligned in a width direction perpendicular to the longitudinal direction.

24 Claims, 29 Drawing Sheets

FIG_3A
_PRIOR ART_
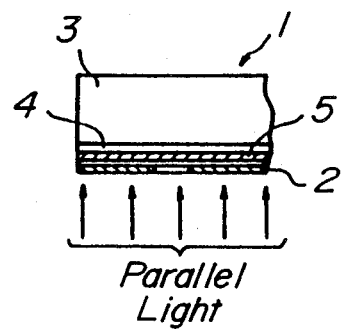
FIG_3B
_PRIOR ART_
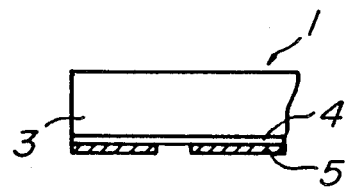
FIG_3C
_PRIOR ART_
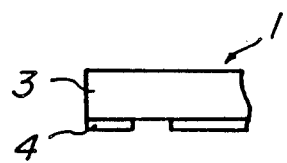
FIG_3D
_PRIOR ART_
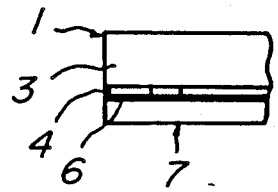

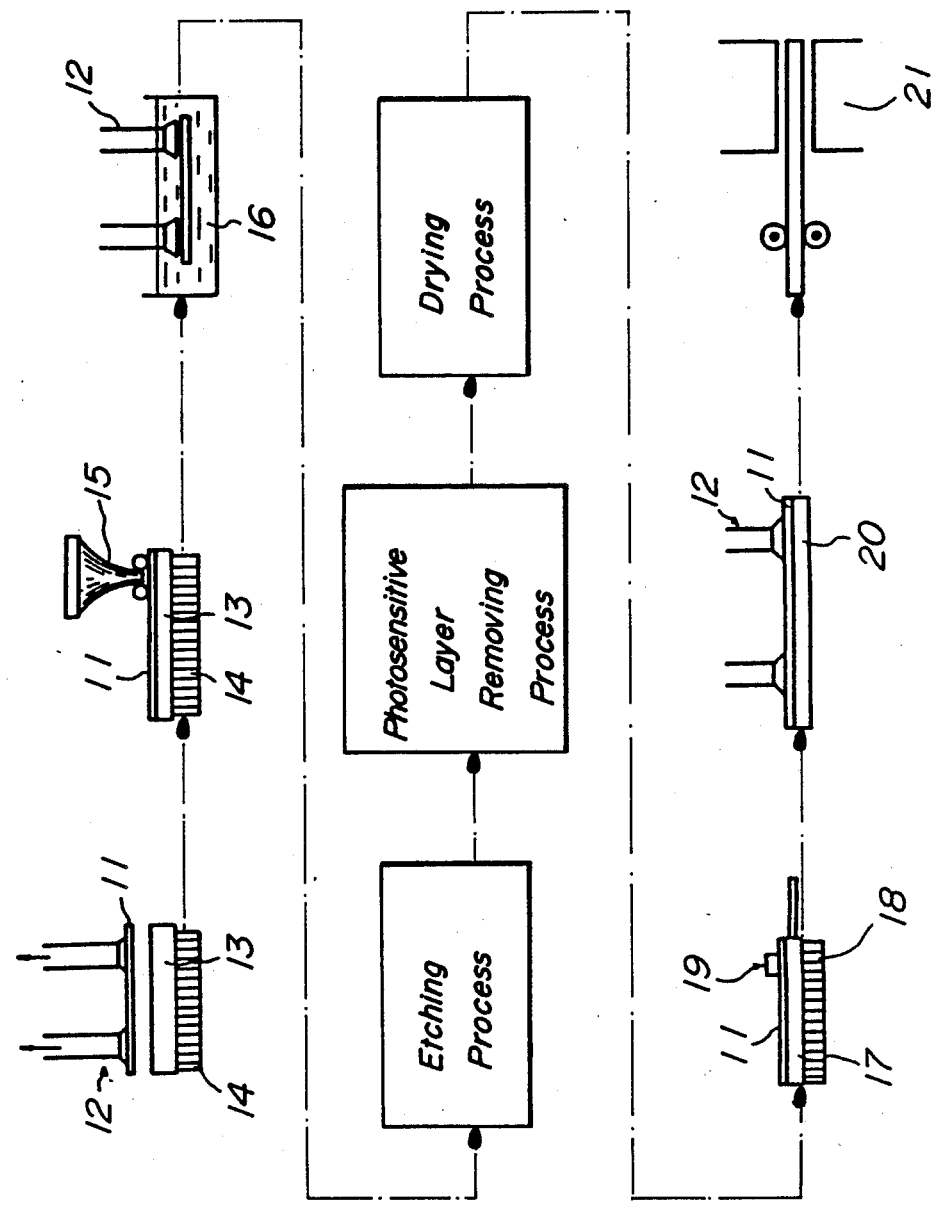

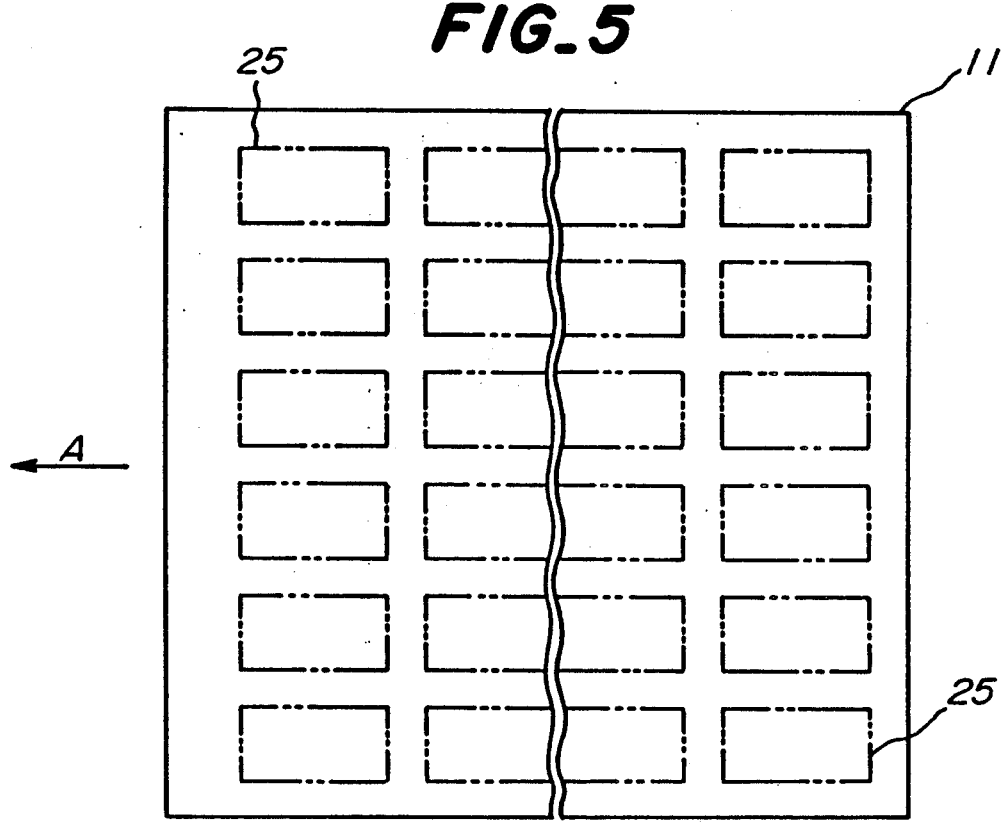
FIG_5
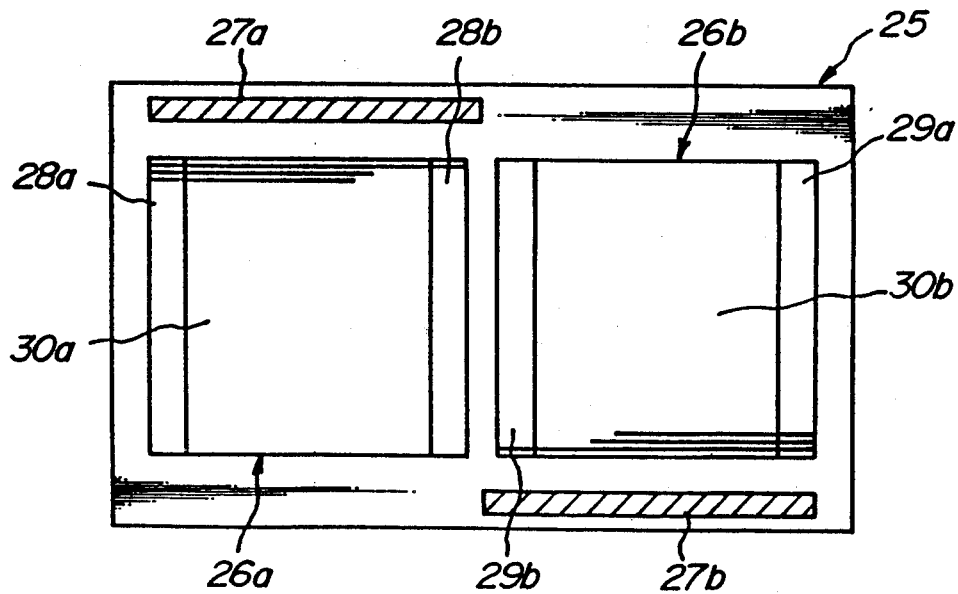
FIG_6

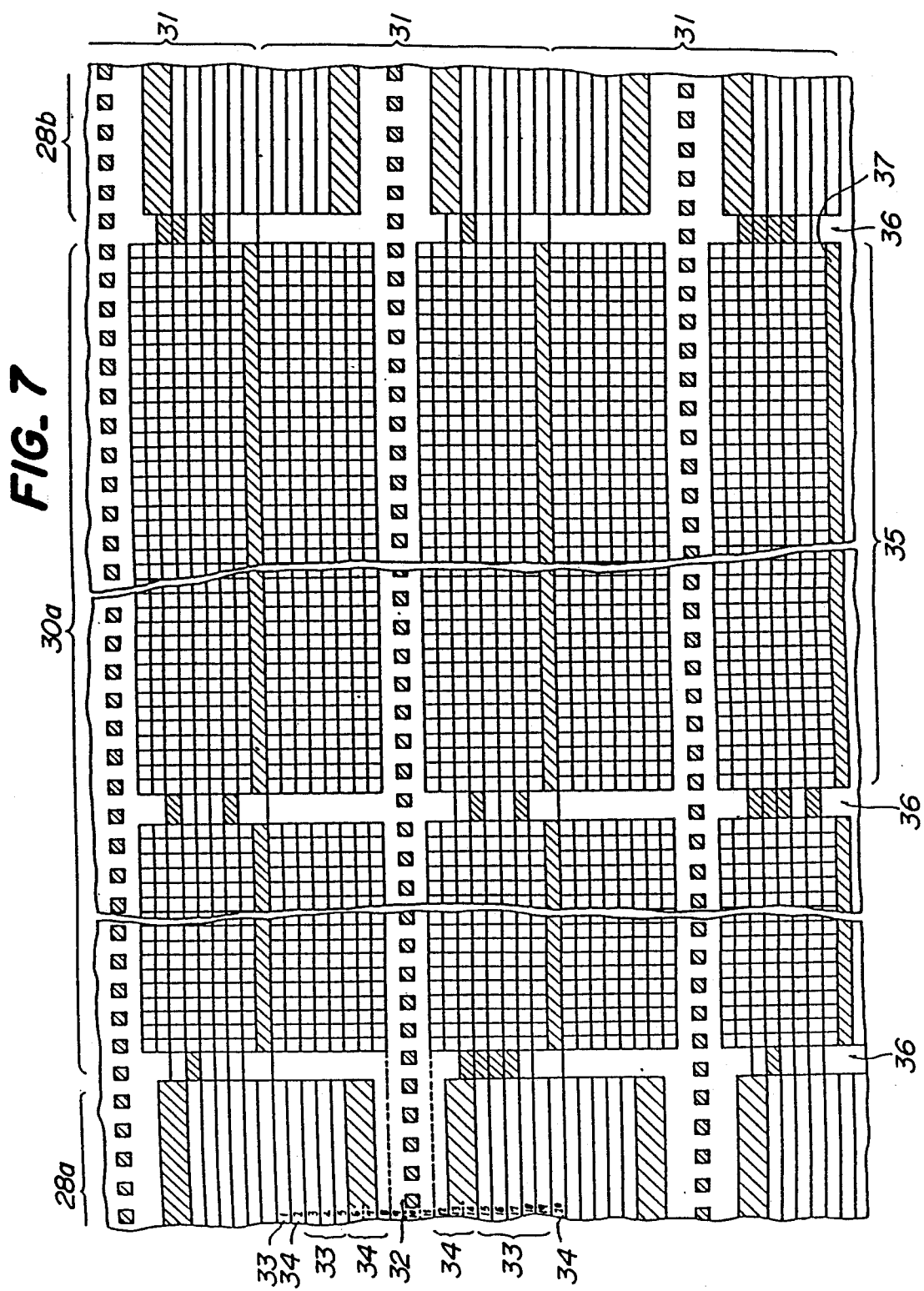

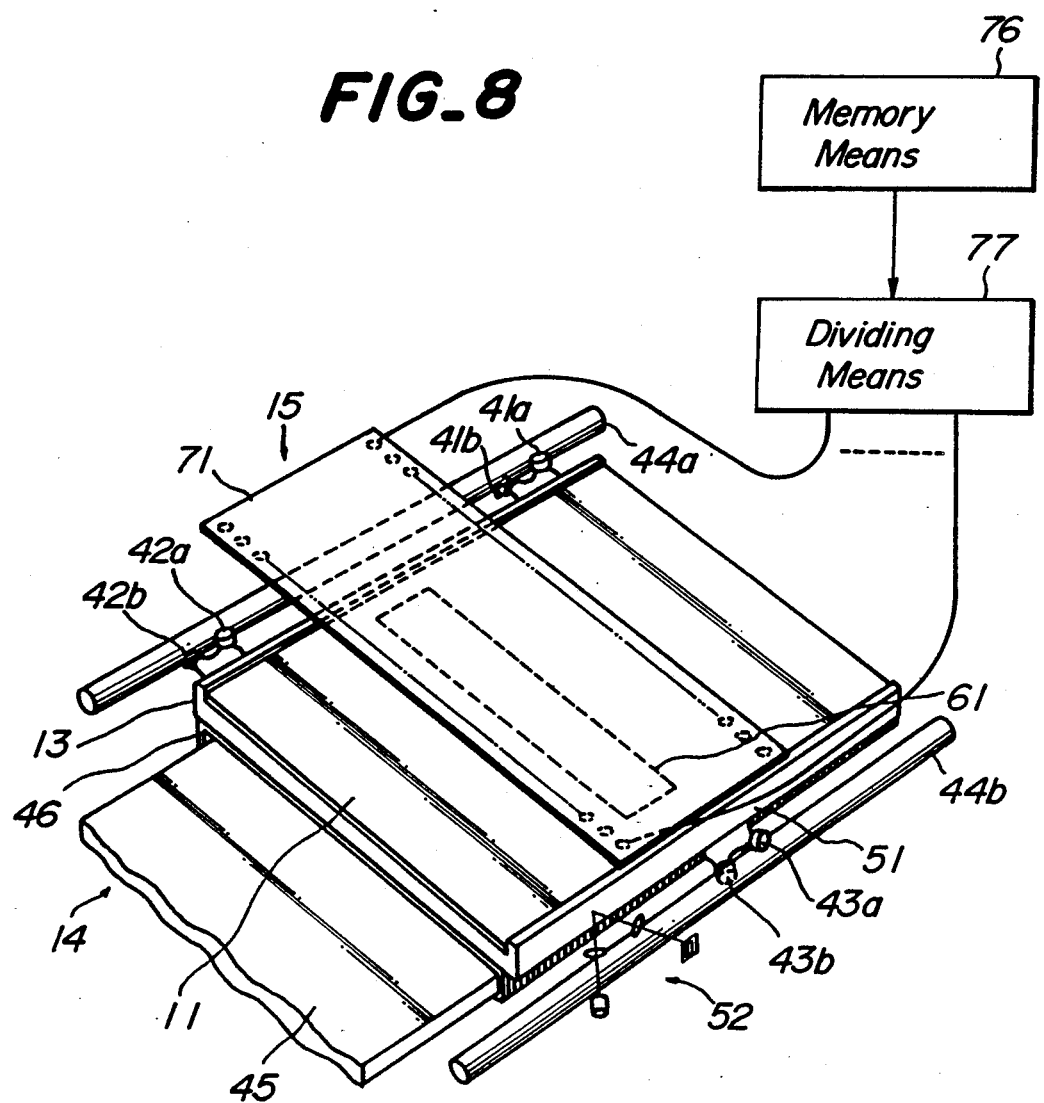

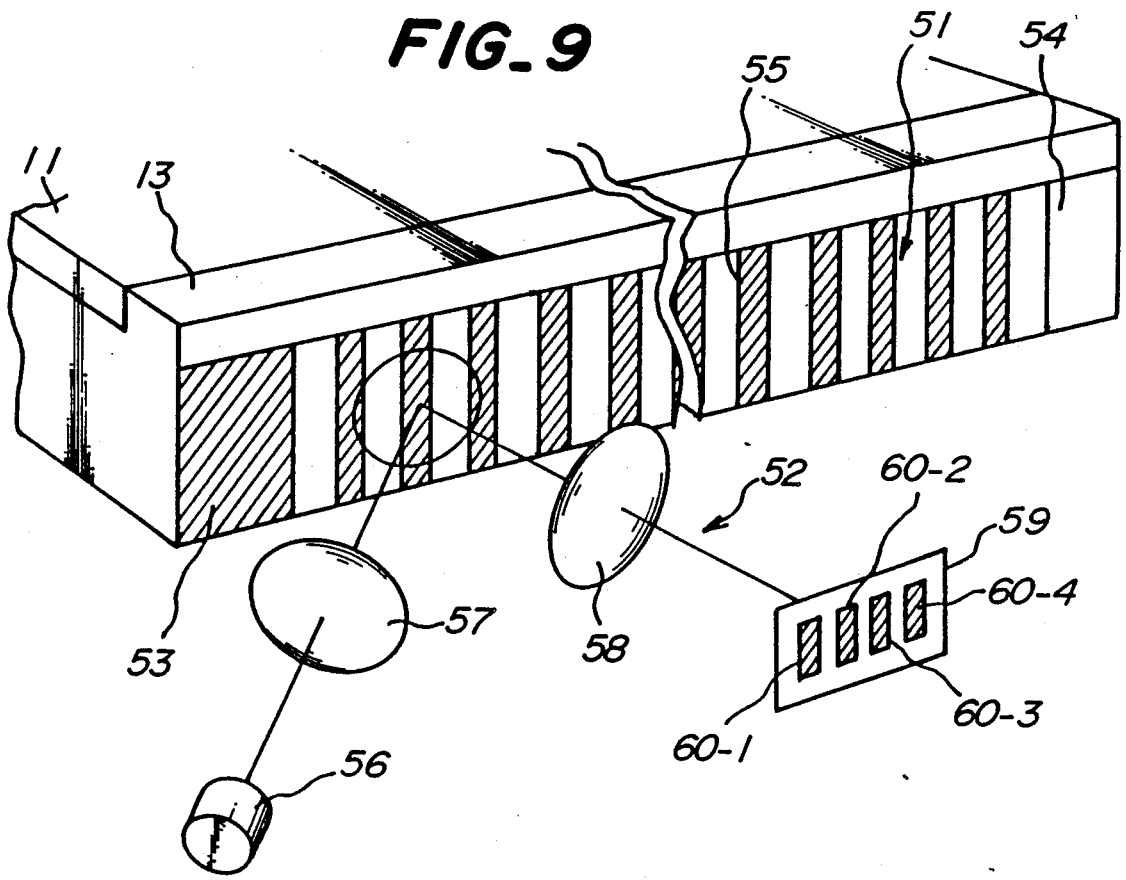
FIG_9
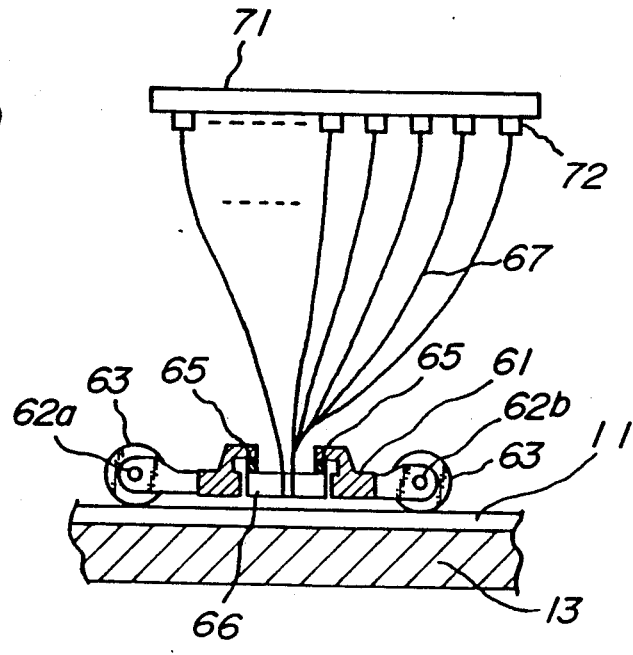
FIG_10

FIG_11
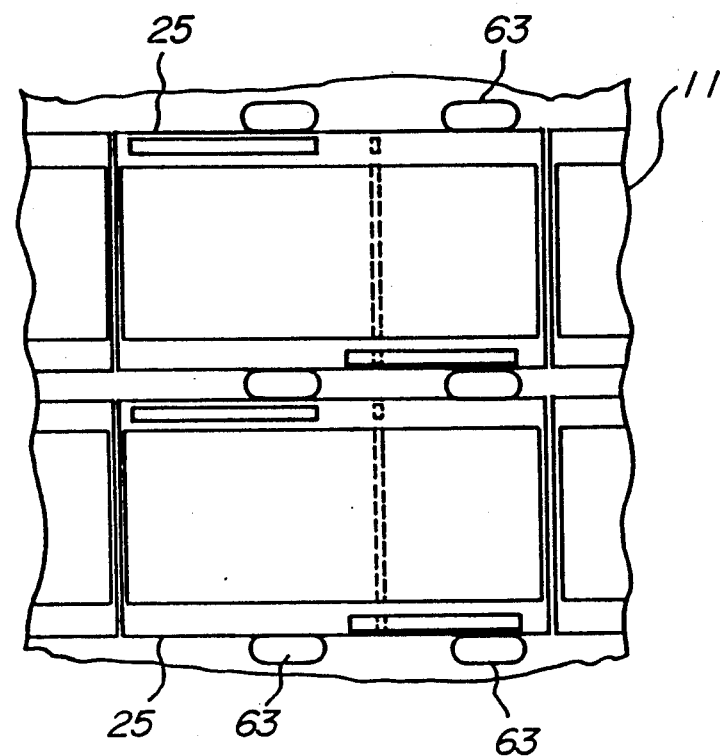
FIG_12
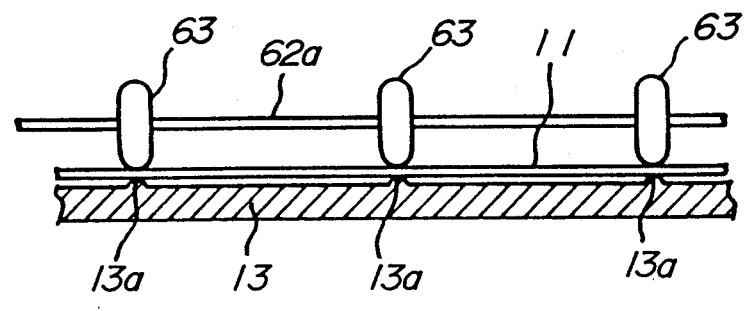

FIG._14
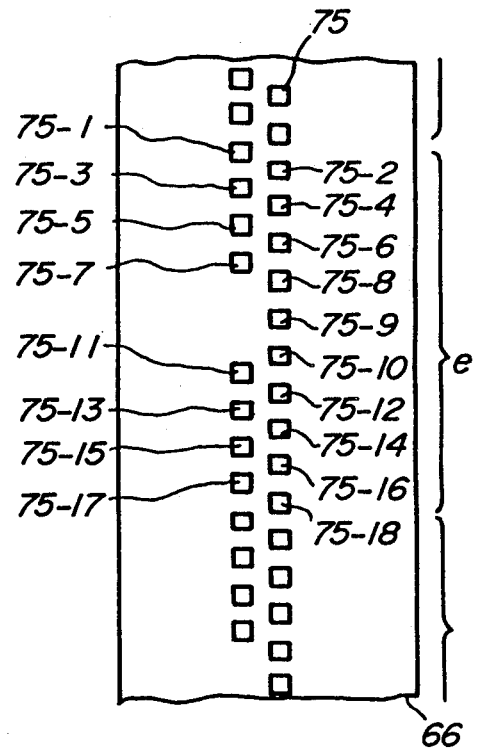
FIG._13
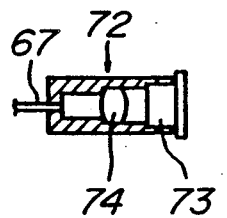
FIG._15
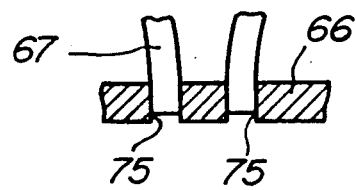

FIG_16
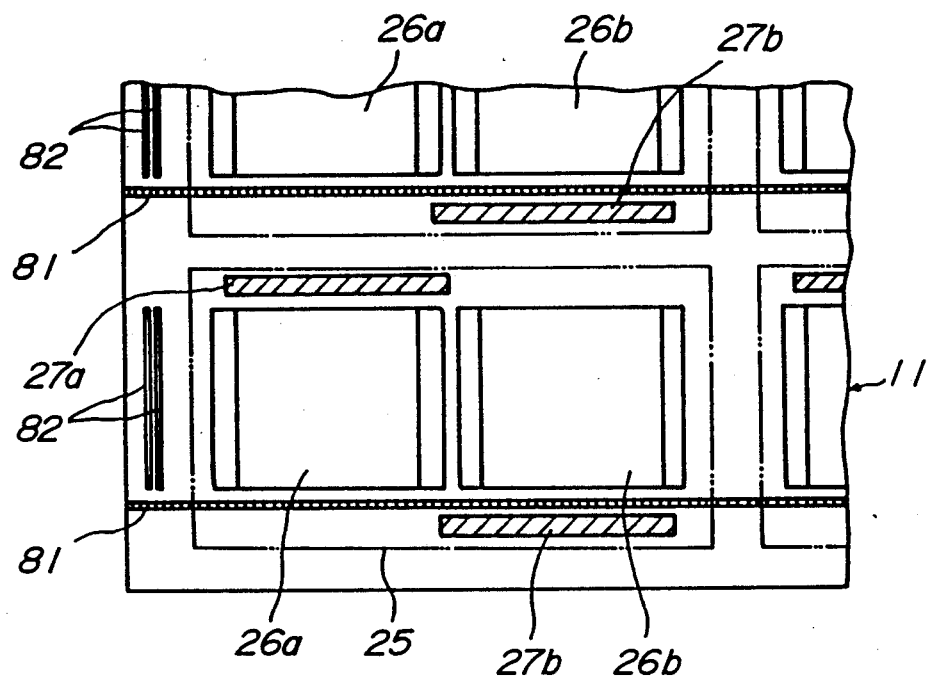
FIG_17
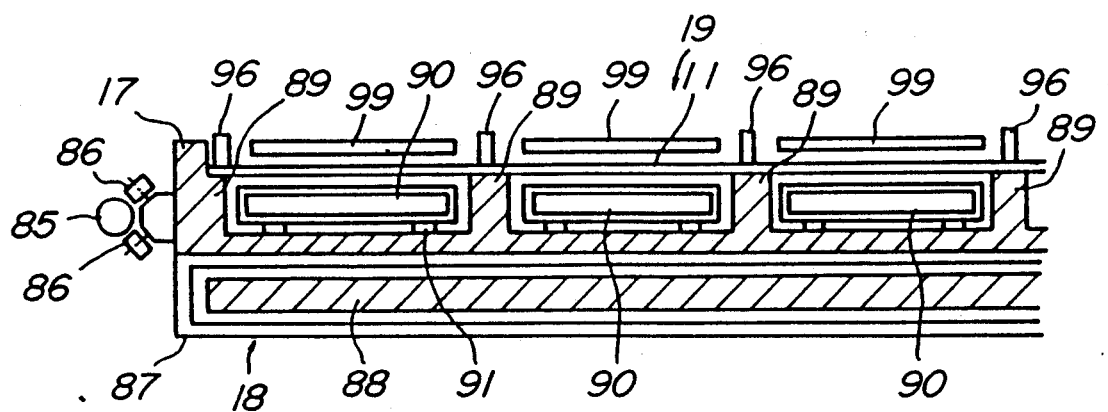

FIG_18
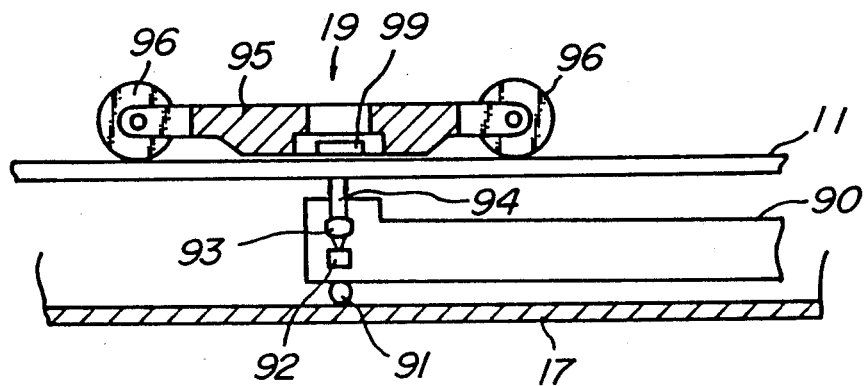
FIG_19
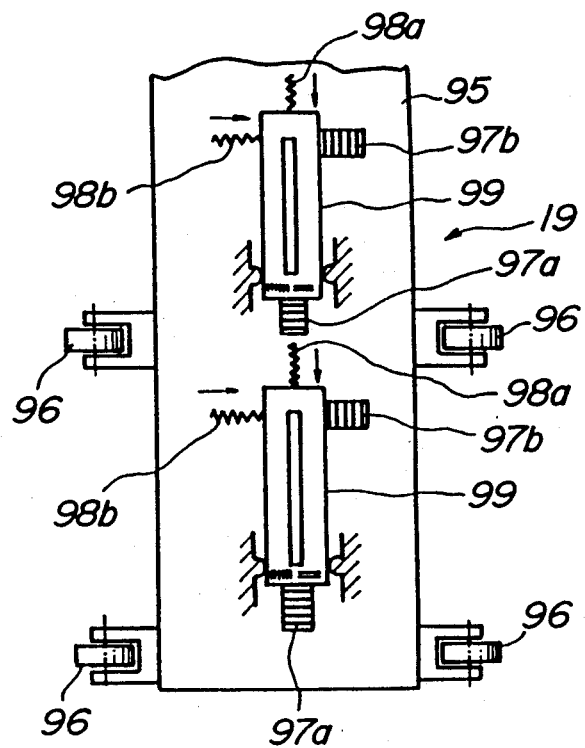

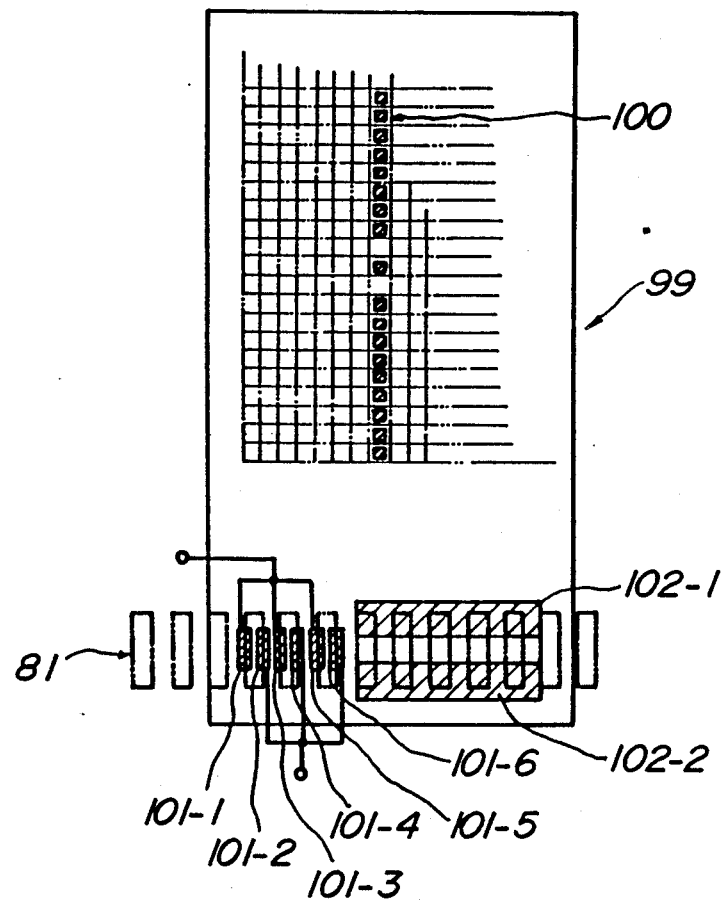
FIG_20
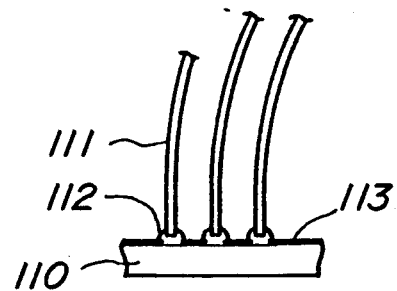
FIG_21

FIG._22
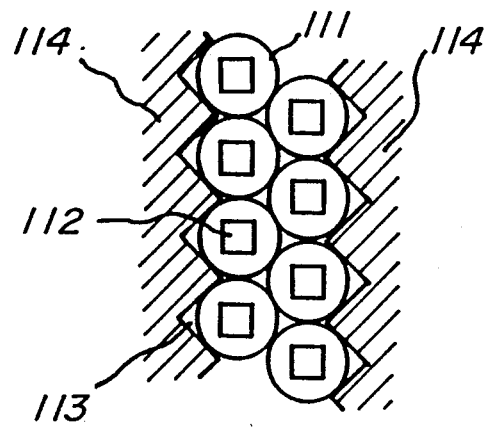
FIG._25
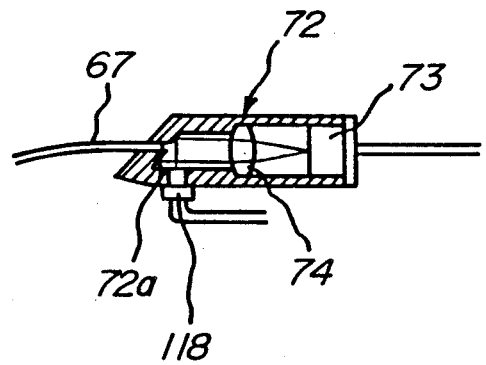
FIG._23
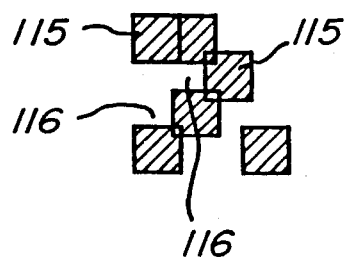
FIG._24
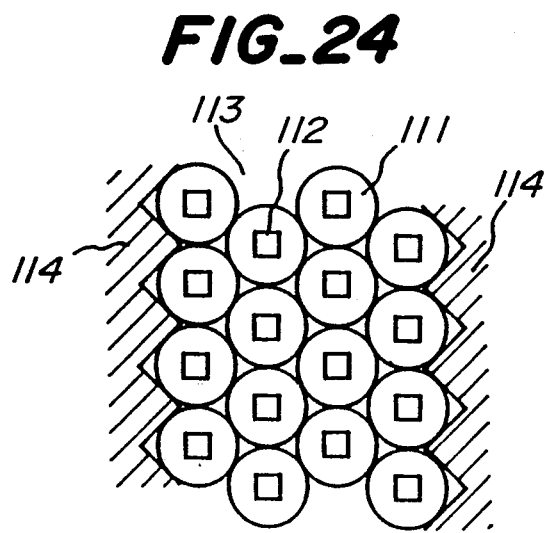
FIG._26
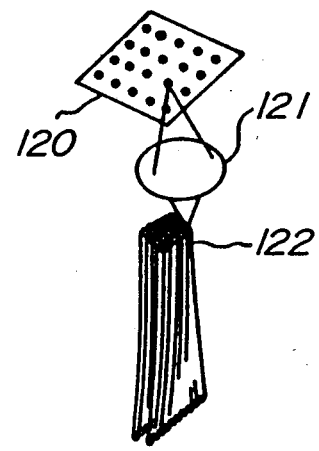

FIG_27A
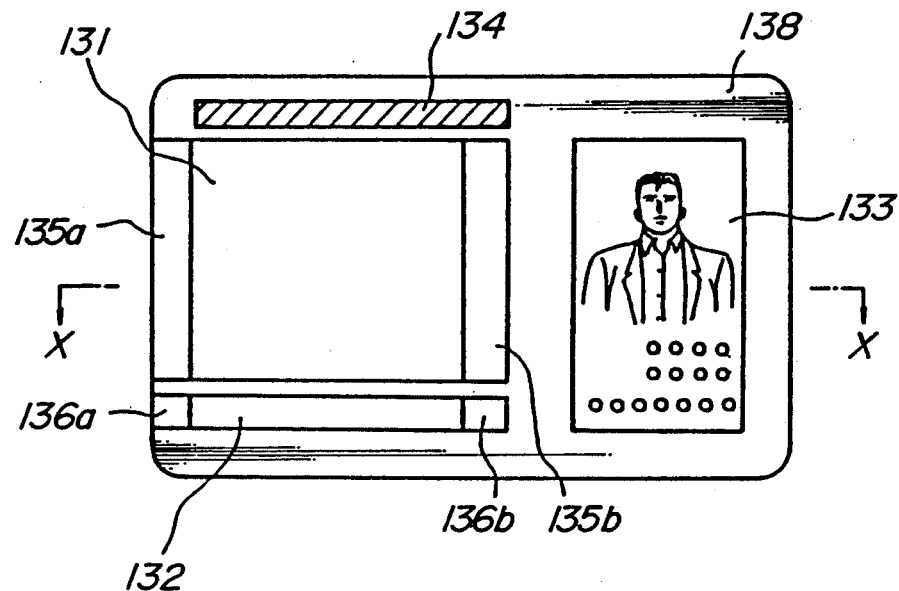
FIG_27B
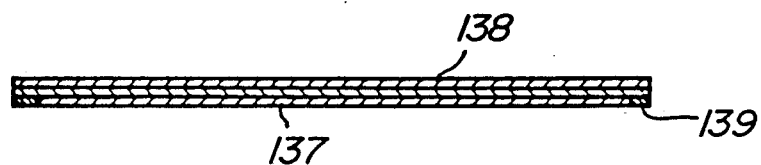
FIG_27C
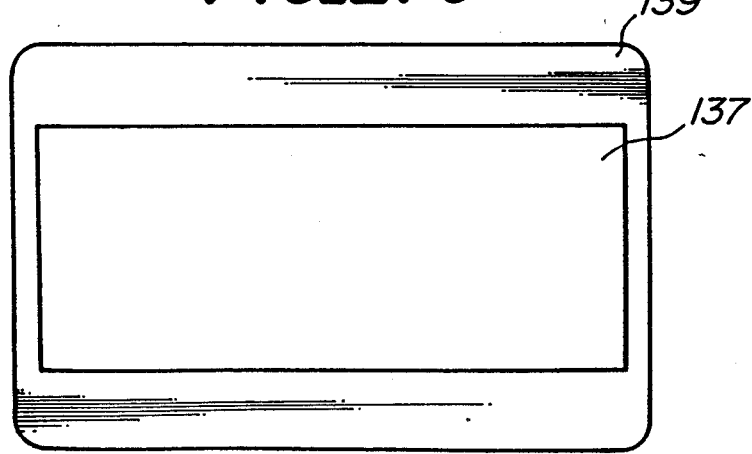

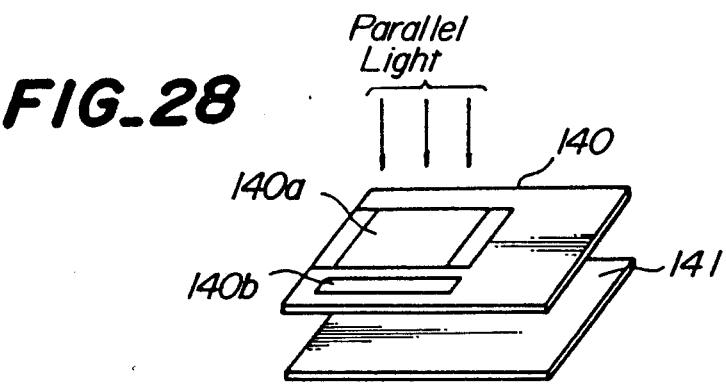
FIG_28
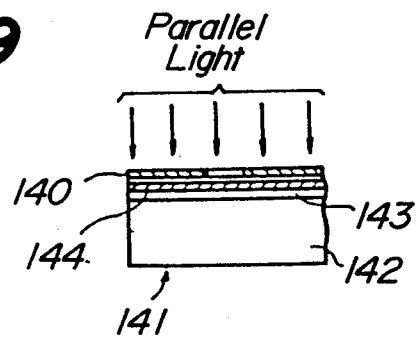
FIG_29
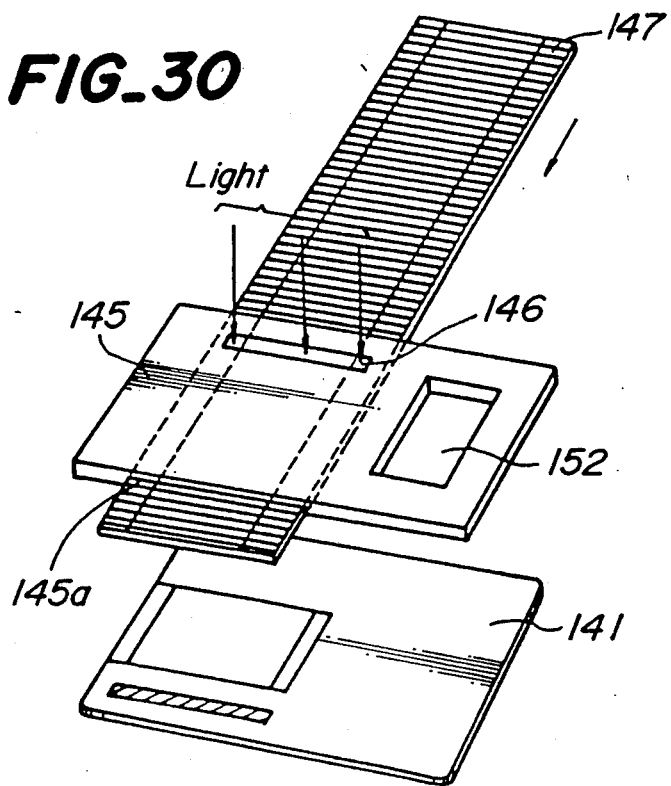
FIG_30

FIG_31
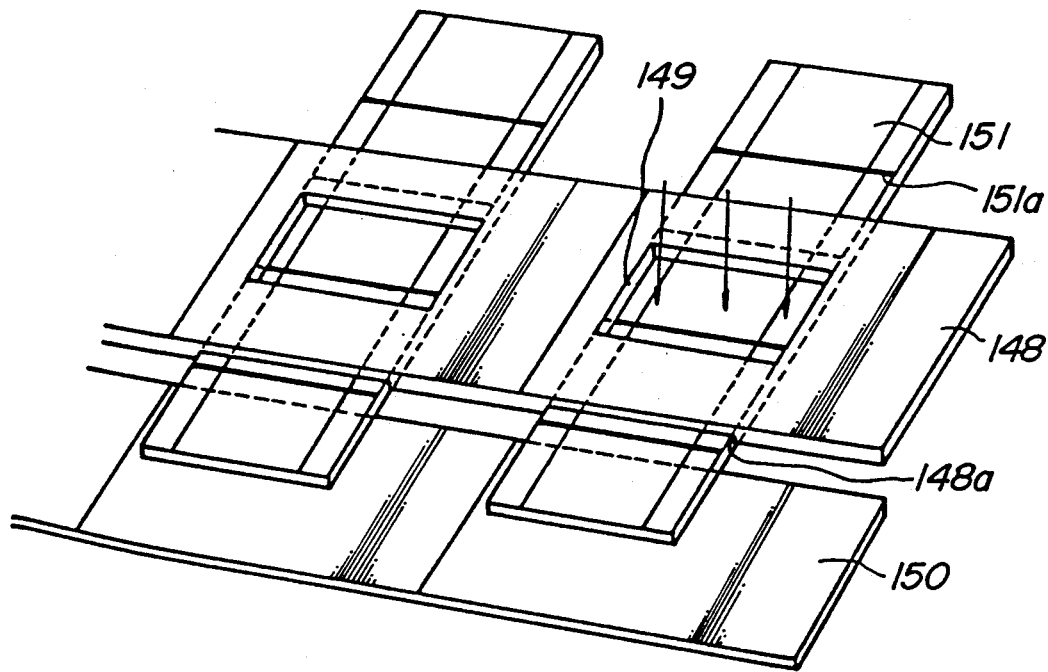

FIG_32A
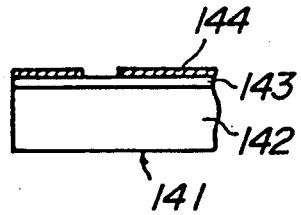
FIG_32B
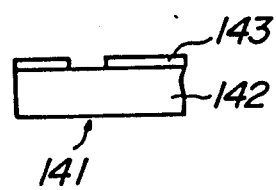
FIG_32C
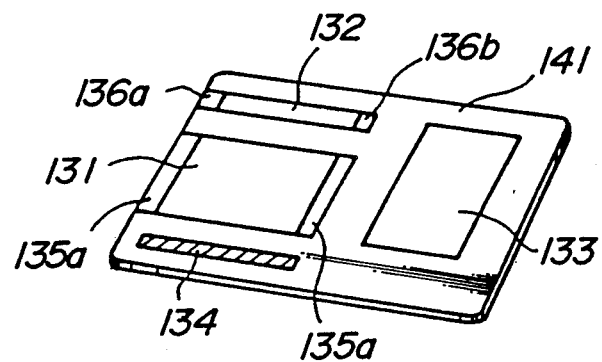
FIG_33
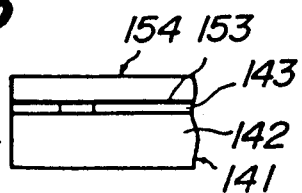

FIG_34
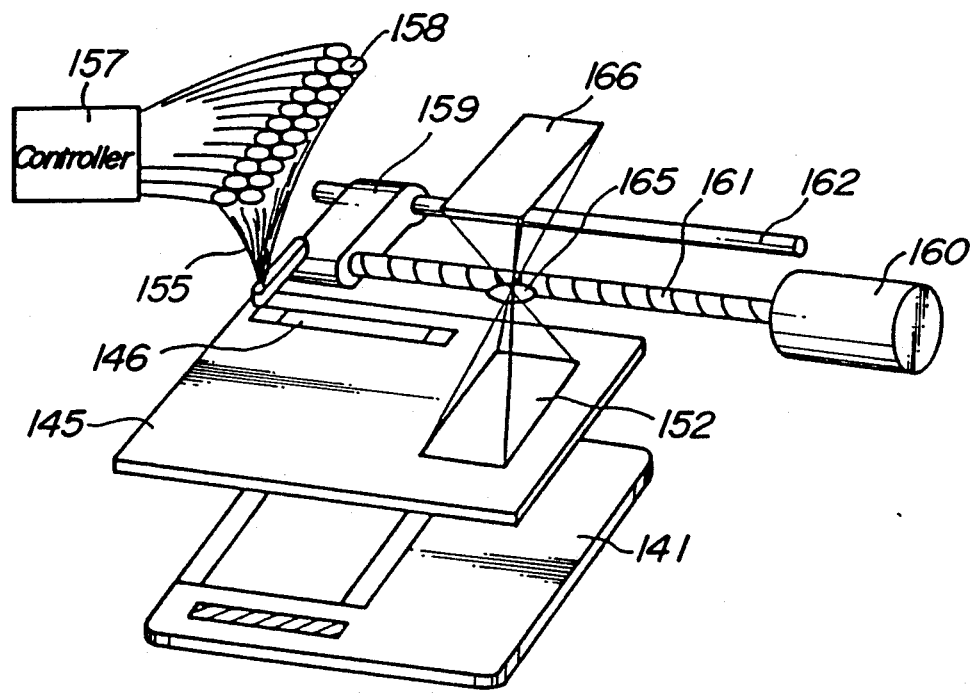
FIG_35
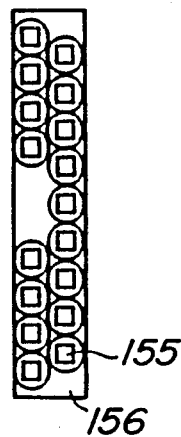

FIG_38
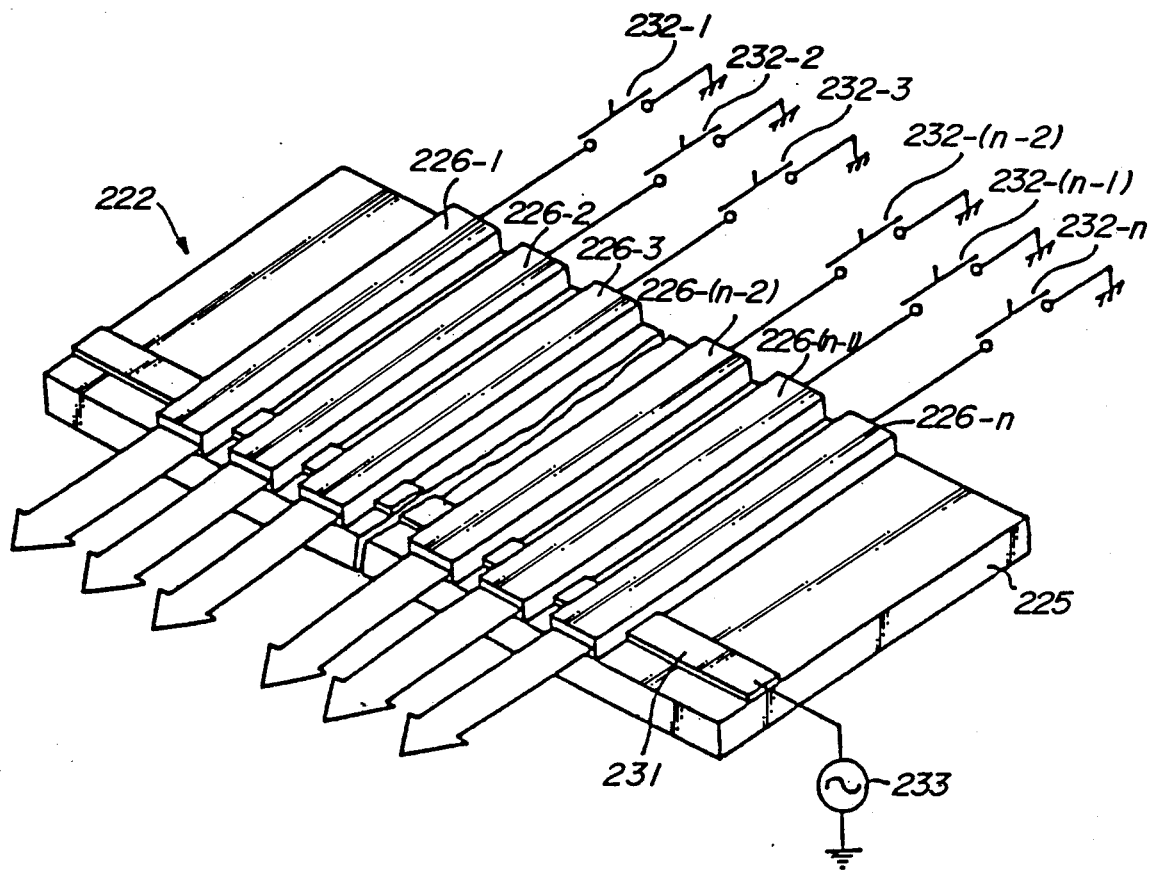

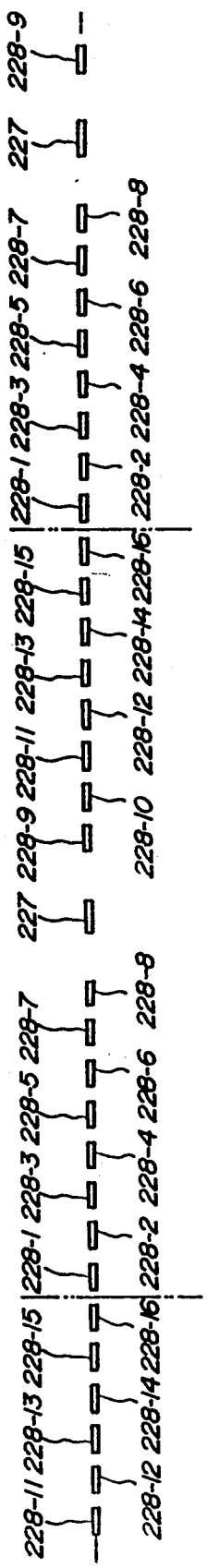
FIG._39
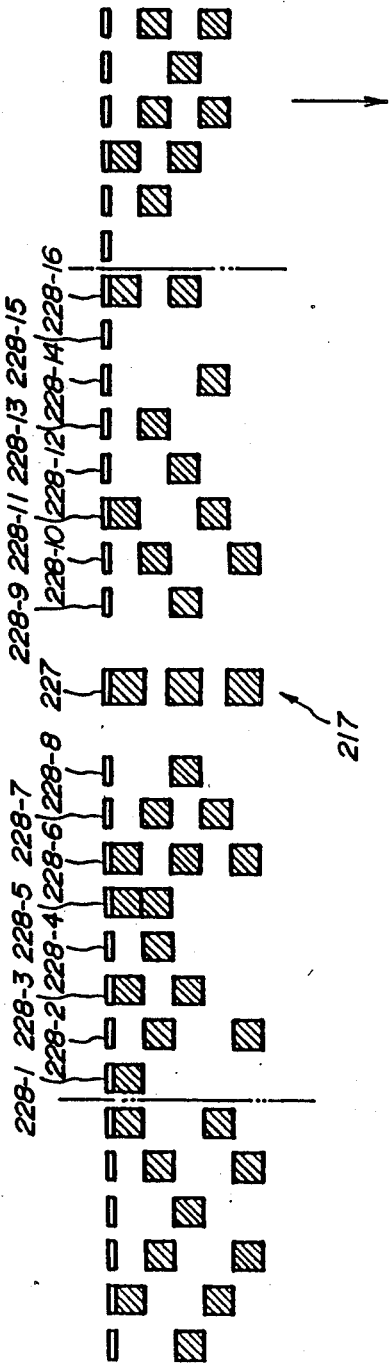
FIG._40

FIG_41
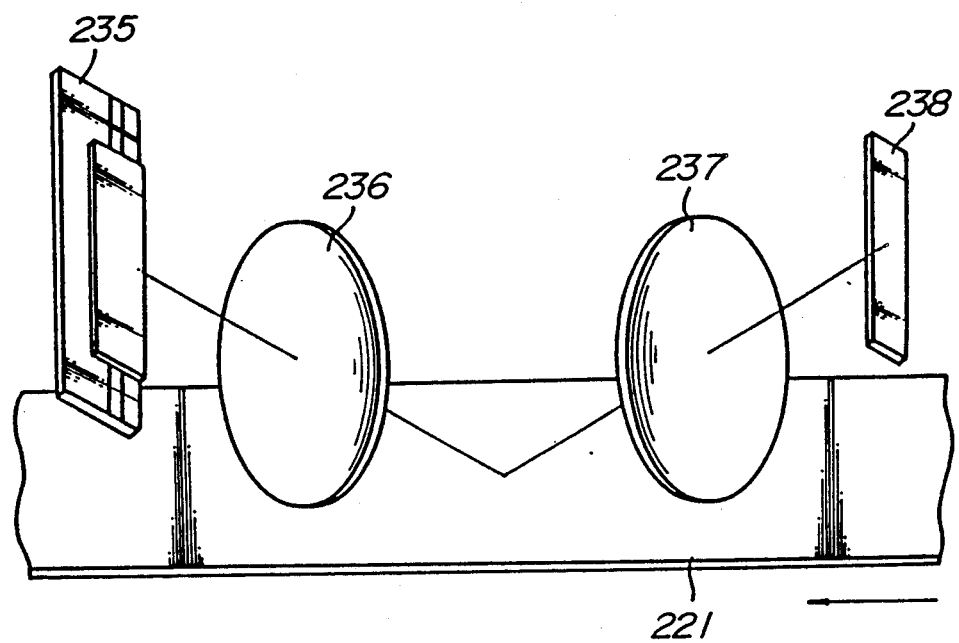

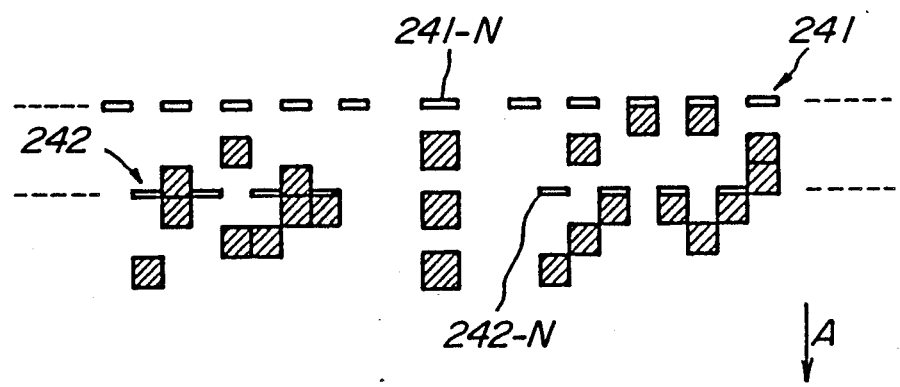
FIG_42

FIG_47

METHOD AND APPARATUS FOR MANUFACTURING OPTICAL CARD

BACKGROUND OF THE INVENTION

Field of the Invention and Related Art Statement

The present invention generally relates to an optical card technique, and more particularly to a method and an apparatus for manufacturing an optical card.

In a known method of manufacturing an optical card of ROM type, a sheet 1 is unwound from a sheet roll as illustrated in FIG. 1, and then is exposed via a plurality of masks 2 each corresponding to respective optical cards as shown in FIG. 2. As depicted in FIG. 3A, the sheet 1 is composed of a lamination of a transparent protection substrate 3, a metal reflection layer 4 such an aluminum layer and a photosensitive layer 5. The photosensitive layer 5 is exposed in accordance with a pattern corresponding to the information to be recorded and born on the mask 2. Then, the photosensitive layer is developed to remove exposed portions thereof as shown in FIG. 3B. Next, the metal reflection layer 4 is selectively etched while the developed photosensitive layer 5 is used as a mask for the etching. After that, the photosensitive layer 5 is removed as illustrated in FIG. 3C. Then, a card substrate 7 having an opaque layer 6 applied on its surface is adhered onto the metal reflection layer 4 as depicted in FIG. 3D. Finally, the sheet 1 is cut into respective optical cards.

In the known method explained above, the information is recorded on the optical card with the aid of the mask 2. It requires a relatively long time for manufacturing and checking the mask. Further, when a relatively smaller number of optical cards are formed from the single mask, the cost for manufacturing the mask per a single optical card would be also increased, so that the cost of the optical card would be also increased.

SUMMARY OF THE INVENTION

The present invention has for its object to provide novel and useful method and apparatus for manufacturing the optical card in a short time period at a low cost.

According to the invention, a method of manufacturing an optical card having a transparent base, a first optical member applied on the base and having a first reflectivity, and a photosensitive layer applied on the first optical member by exposing the photosensitive layer with light modulated in accordance with a data signal to be recorded, removing selectively the first optical member with the aid of the exposed photosensitive layer, and applying on the first optical member a second optical member having a second reflectivity different from the first reflectivity, the improvement being characterized in that:

said photosensitive layer is simultaneously exposed with a plurality of light beams emitted from a plurality of light sources and modulated in accordance with the data signal by means of a plurality of optical fibers.

BRIEF DESCRIPTION OF THE DRAWINGS

FIGS. 3A to 3D are schematic views depicting successive steps of the known method;

FIG. 4 is a schematic view illustrating an embodiment of the optical card manufacturing method according to the invention;

FIG. 5 is a plan view showing a sheet shown in FIG. 4;

FIG. 6 is a plan view representing the format of the optical card;

FIG. 7 is a plan view denoting the bit construction of the data track of the optical card;

FIG. 8 is a perspective view showing the shuttle driving means;

FIG. 9 is a schematic perspective view illustrating the position detecting means;

FIG. 10 is a cross sectional view depicting the exposing means;

FIGS. 11 and 12 are plan and cross sectional views, respectively showing the sheet feeding means;

FIG. 13 is a cross sectional view illustrating the incident end construction of optical fiber;

FIG. 14 is a plan view depicting the openings formed in the member for holding the exit ends of optical fibers;

FIG. 15 is a cross sectional view showing the exit end construction of the optical fiber;

FIG. 16 is a plan view representing the sheet;

FIG. 17 is a cross sectional view illustrating the sheet feeding means;

FIGS. 18 and 19 are cross sectional and plan views, respectively, of the checking means;

FIG. 20 is a schematic plan view showing the photodetector of the checking means;

FIG. 21 is a cross sectional view depicting another embodiment of the exit end construction of the optical fibers;

FIGS. 22, 23, 24, 25 and 26 show several embodiments of the recording means;

FIGS. 27A, 27B and 27C are plan, cross sectional and rear views, respectively, of an embodiment of the optical card according to the invention;

FIGS. 28, 29 and 30 illustrate successive steps for manufacturing the optical card according to the invention;

FIG. 31 is a schematic view showing another method of recording the common data;

FIGS. 32A, 32B and 32C depict successive steps after the exposure;

FIG. 33 is a cross section representing the completed optical card;

FIG. 34 is a perspective view showing the personal data recording apparatus according to the invention;

FIG. 35 is a plan view illustrating the exit end construction of the optical fibers;

FIG. 38 is a perspective view showing the thin film electroluminescent (TFEL) element array;

FIG. 39 is a plan view illustrating the array of TFEL elements;

FIG. 40 is a schematic view showing the recorded bits;

FIG. 41 is a perspective view depicting an embodiment of the apparatus for checking the recorded condition;

FIG. 42 is a schematic view showing another embodiment of the TFEL element array;

DESCRIPTION OF THE PREFERRED EMBODIMENTS

Figure 1:
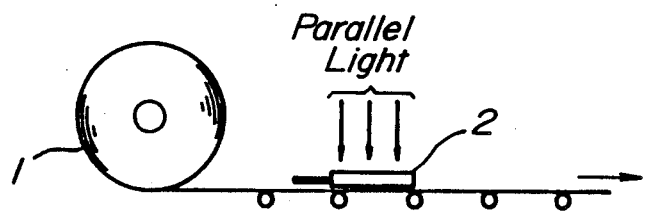
FIG. 1 is a schematic view showing the known method of manufacturing the optical card of ROM type.
Figure 2:
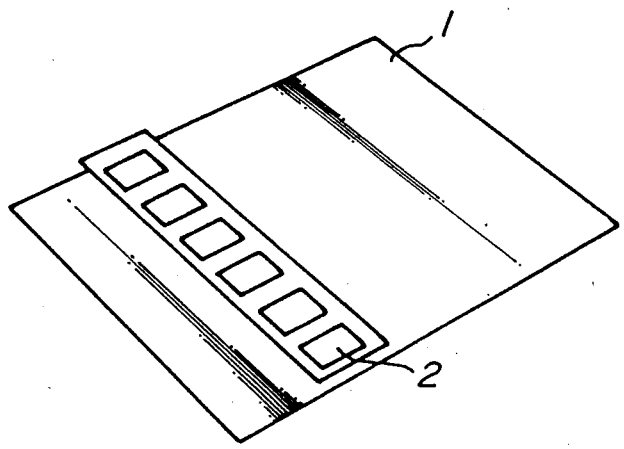
FIG. 2 is a perspective view illustrating the mask shown in FIG. 1.

FIG. 4 is a schematic view showing successive steps of an embodiment of the optical card manufacturing method according to the invention. At first, a strip unwound from a sheet roll is cut into a sheet 11. Then, the sheet 11 is sucked by a sucking means 12 and is set onto a shuttle 13. The sheet 11 has the same construction as that shown in FIG. 3A and comprises the transparent protection substrate, metal reflection layer and photosensitive layer Then, the shuttle 13 is moved by means of a feeding means 14 such as a voice coil motor through an exposing means 15, such that the photosensitive layer is exposed to light in accordance with the information to be recorded After the exposure, the sheet 11 is transported into a developing means 16 with the aid of the sucking means 12, so that exposed portions of the photosensitive layer are removed. Then, the metal reflecting layer is selectively etched via openings formed in the photosensitive layer. Next, the photosensitive layer is removed and the sheet 11 is dried. Then, the sheet 11 is set onto a shuttle 17 and the shuttle is moved by means of a feeding means 18 such as a voice coil motor. During this movement, the recorded information is read out by means of a checking means 19, and the read out information is compared with the original information to check whether or not the information has been recorded correctly or not. After checking the recorded condition, a card substrate 20 having an opaque layer is adhered to the metal reflecting layer, and finally the sheet is cut into respective optical cards by means of a cutting means 21.

In the present embodiment, a plurality of optical cards 25 are arranged in a matrix on the sheet 11 along a feeding direction shown by an arrow A and a direction perpendicular to the feeding direction as illustrated in FIG. 5.

FIG. 6 is a plan view showing the optical card 25 on an enlarged scale. In the present embodiment, the optical card 25 includes two data record areas 26a and 26b which are aligned in the longitudinal direction of the optical card. In the case of using the optical card, the card is inserted into the card reader from the right or left side. The optical card 25 further comprises two position detecting marks 27a, 27b each corresponding to respective data record areas 26a, 26b. In each data record area 26a, 26b, there are formed a number of data tracks, for instance two hundred tracks are recorded, said tracks extending in the direction in which the card is inserted into the card reader. At respective ends of the tracks there are formed seek portions 28a, 28b and 29a, 29b in which track numbers are recorded Therefore, the data area 30a, 30b are provided between the seek portions.

FIG. 7 is a schematic plan view showing the construction of the track 31 in the data record region 26a. The track 31 includes twenty lines which are arranged in parallel with each other in the longitudinal direction of the card and are separated from each other by a constant distance. In a tenth line counted from the uppermost line, there is formed a clock pattern 32 which extends throughout the seek portion 28a, data portion 30a and seek portion 28b. The clock pattern 32 to consists of an array of square black blocks arranged equidistantly. By reproducing the clock pattern 32 it is possible to effect the generation of clock pulses and the detection of the focusing and tracking errors. Line Nos. 1, 3~5 and 15~19 in the seek areas 28a and 28b constitute a track number portion 33 in which a track number pattern representing a track number of a relevant track is recorded. Lines Nos. 2, 6~8, 12~14 and 20 constitute a track number pattern identifying portion 34 in which an identification pattern for identifying the track number pattern is recorded. The track number identification pattern is common for all tracks. In the present embodiment, the track number identifying pattern 34 is formed by the lines Nos. 2, 8, 12 and 10 made of white lines (corresponding to "1" of binary data) and the line Nos. 6, 7, 13 and 14 made of black lines (corresponding to "0" of binary data). When the identifying pattern is detected, the track number written in the track number portion 33 is read out. It should be noted that the track number identifying pattern exists in a single track and can never be found in two adjacent tracks.

In the data portion 30a, a plurality of frames 35 are provided in each single track 31, and frame numbers 36 for identifying respective frames are recorded between successive frames 35 as well as between the seek portions 28a, 28b and the frames 35. In each frame, there is provided a frame synchronizing line 37 in the last line No. 20 so as to derive a frame synchronous signal In the data portions 30a, data signals of two bytes each being composed of eight bits are recorded in the upper eight lines Nos. 1~8 and lower eight lines Nos. 12~19. These two byte data signals are read out simultaneously in synchronism with the black clock pattern 32. The other record area 26b has the same track construction as that explained above.

Now the respective steps of the manufacturing method shown in FIG. 4 will be explained in detail.

FIG. 8 represents the transporting means 14 and exposing means 15 which are used in the exposing step. The shuttle 13 is arranged movable along parallel guide rods 44a, 44b by means of two pairs of guide rollers 41a, 41b secured to one side edge of the shuttle and a pair of guide rollers 43a, 43b arranged on the other side edge of the shuttle. In parallel with the guide rods 44a, 44b there is arranged a permanent magnet 45. A voice coil 46 is secured to the rear surface of the shuttle 13 such that the permanent magnet is passed through the coil. When the direct current is supplied to the voice coil 46, the shuttle 13 is moved along the guide rods 44a, 44b.

In order to control the operation of the exposing means 15 in conjunction with the movement of the shuttle 13 as shown in FIG. 9, a scale 51 is provided on one side of the shuttle 13 along the moving direction and a read out means 52 is arranged to read the scale. The scale 51 includes a black start mark 53 denoting the start position, a white end mark 54 representing the end position, and a black and white clock pattern 55 situated between the start and end marks 53 and 54, respectively. The clock pattern 55 of the scale 51 has the same pitch as that of the clock pattern 32 formed on the optical card. The read out means 52 comprises a light emitting element 56 such as a light emitting diode, illumination lens 57, imaging lens 58 and light detector 59. Light from the light emitting element 56 is projected by means of the illumination lens 57 onto the scale 51 as a small light spot, and an image of an illuminated portion of the scale 51 is formed by the imaging lens 58 on the light detecting element 59. The light detecting element 59 includes a plurality of light receiving areas, e.g. four light receiving areas 60-1~60-4. In accordance with a sum of output signals from the four light receiving areas 60-1~60-4 and a difference between a sum of output signals from the areas 60-1, 60-3 and a sum of output signals from the areas 60-2, 60-4, the start position, stop position and data record position can be detected to produce necessary signals. That is to say, when the sum of the signals from the areas 60-1~60-4 decreases below a predetermined value, it is judged that the start mark 53 is detected, and the start signal is generated. When the sum of the output signals from the areas 60-1~60-4 exceeds a predetermined threshold value, it is confirmed that the end mark 54 is detected, and the end signal is produced. In the data record position, the clock pulse synchronized with the clock pattern 55 is generated in accordance with the difference between the sum of the output signals from the areas 60-1, 60-3 and that from the areas 60-2, 60-4.

In FIG. 8, at the exposing position of the sheet 11 transported by the shuttle 13, there is arranged a frame-like holding member 61 which extends in the direction perpendicular to the sheet traveling direction as illustrated in FIG. 10. At both ends of the holding member 61 plural pairs of rollers 63 are arranged rotatably with the aid of shafts 62a, 62b, said rollers 63 being urged against the upper surface of the sheet 11. It should be noted that the rollers 63 are arranged such that they are brought into contact with the sheet 11 at areas outside the optical card as illustrated in FIG. 11. Further, the shuttle 13 has projections 13a shown in FIG. 12 at positions such that the projections face the rollers 63. The projections 13a are brought into contact with the rear surface of the sheet 11, said projections being extended in the sheet traveling direction. Therefore, the sheet 11, transported on the shuttle 13, can be kept flat at the exposing position.

As depicted in FIG. 10, to the holding member 61 is secured a holding member 66 by means of a plurality of bimorphs 65 such that the holding member can be moved up and down and is selectively brought into contact with the sheet 11. A number of optical fibers 67 are secured to the holding member 66 such that exit ends of the optical fibers are aligned in the direction perpendicular to the sheet feeding direction. The optical fibers 67 are divided into three groups, i.e. a first group which includes a large number of optical fibers corresponding to respective bits of all tracks, a second group containing optical fibers for forming the position detecting marks 27a, 27b (see FIG. 6), and a third group having optical fibers for forming the clock patterns extending in the track direction on portions of the optical cards outside the record areas in order to position the optical cards, with respect to the light detector during the checking process, which will be explained hereinafter. The number of optical fibers in the first group can be calculated as follows The optical card contains 200 tracks and each track contains 18 lines, so that the optical card includes 200×18=3600 lines, i.e. bits. Now it is assumed that six optical cards are arranged in the direction perpendicular to the sheet feeding direction, the number of optical fibers in the first group is equal to 6×3600=21600.

As shown in FIG. 10, the incident ends of the optical fibers 67 are secured to couplings 72 fixed to a stationary member 71. As illustrated in FIG. 13, the coupling 72 includes a collimator lens 74 for introducing light emitted from a semiconductor laser 73 onto the incident end of the optical fiber 67.

In the present embodiment, as shown in FIG. 14, in the holding member 66 there are formed two arrays of rectangular openings 75 which are separated from each other in the sheet feeding direction by a distance equal to one bit, and exit ends of the optical fibers 67 are inserted into the openings such that the exit end surfaces of the optical fibers are set back with respect to the lower surface of the holding member 66 as illustrated in FIG. 15. In FIG. 14, a range e corresponds to one track, and the first to eighth lines Nos. 1~8 correspond to openings 75-1~75-8, the tenth line of the clock pattern 32 the opening 75-9, the twelfth nineteenth lines Nos. 11 19 the openings 75-10~75-17, and the twentieth line No. 20 constituting the frame synchronizing line 37 corresponds to the opening 75-18. Therefore, in the present embodiment two halves of one byte data are recorded successively That is to say, after the first half of one byte data has been recorded and the sheet 11 has been fed by two clock pitches, the second half of the one byte data is recorded. To this end, as illustrated in FIG. 8, the data signal stored in a memory means 76 is first read out into a dividing means 77 and is divided into two halves. The semiconductor lasers 73 (see FIG. 3) are controlled in accordance with the thus divided signals.

As explained above in detail, in the present embodiment, the shuttle 13 accommodating the sheet 11 is fed and the scale 51 provided on the side wall of the shuttle is read out by the read out means 52, and the sheet 11 is exposed by the semiconductor lasers 73 via the optical fibers 67 in accordance with the output signal from the read out means 52 and the data signal to be recorded.

FIG. 16 is a schematic plan view showing the exposing condition for the sheet 11. A clock pattern 81 is formed in the sheet feeding direction by means of the first group optical fibers in synchronism with the clock pulses which are obtained from the read out means 52 subsequent to the start signal A pair of lines 82 are formed at a front portion of each optical card 25 by means of the first group optical fibers in accordance with a count value of the clock pulses. As will be explained later, the lines 82 are used in the checking step. The position detecting marks 27a, 27b are formed by means of the second group of optical fibers in synchronism with the clock pulses under the control of the count value of clock pulses. Further, in the data record areas 26a, 26b various kinds of information such as track numbers, track number patterns, frame numbers, frame number patterns, and data are recorded with the aid of the first group optical fibers. When the sheet 11 is exposed, the bimorph 65 is driven to move the holding member 66 toward the sheet 11 or to bring the holding member 66 into contact with the sheet, so that the exposure having the sharp contour configuration can be carried out without causing the blur of light.

After the exposure has been completed in the manner just explained above, the developing step, etching step, photosensitive layer removing step, drying step, and checking step are conducted successively as has been explained with reference to FIG. 4.

FIG. 17 shows the construction of the shuttle 17 and checking means 19. The shuttle 17 is arranged movable along a pair of parallel guide rods 85 with the aid of guide rollers 86, and the feeding means 18 comprises a voice coil 87 secured to the lower surface of the shuttle 17 and a permanent magnet 88 which is inserted into the voice coil. On the upper surface of the shuttle 17, there are formed ridges 89 which extend in the moving direction of the shuttle and support the sheet 11 at positions outside the card area. In spaces defined by the ridges 89 there are arranged box-like members 90. As illustrated in FIG. 18, rollers 91 are provided on the lower surface of the box-like member, said rollers being brought into contact with the shuttle 17. In the box-like member 90, there are arranged a light source 92 and a collimator lens 93. Light emitted from the light source 92 is converted by the collimator lens 93 into a parallel light flux which is projected upon the sheet 11 via a slit 94 formed in the box-like member 90, said slit being extended in the direction perpendicular to the moving direction of the shuttle 17.

Above the slit 94 of the box-like member 90 there is arranged a frame-like holding member 95 which extents in the direction perpendicular to the feeding direction of the sheet 11. At both ends of the holding member 95 there are arranged rollers 96 which serve to urge the sheet 11 against the ridges 89 of the shuttle 17. Therefore, the sheet 11 which travels on the shuttle 17 is flattened at the checking position, i.e. the position opposite to the slit 94 formed in the box-like member 90.

To the holding member 95 is arranged movably in the horizontal plane a photodetector 99 of the checking means 19 by means of a pair of bimorphs 97a, 97b and a pair of spring members 98a, 98b. As shown in FIG. 20, the photodetector 99 comprises eighteen light receiving elements 100 each corresponding to respective data bits aligned in the direction perpendicular to the track direction. The photodetector 99 further includes six light receiving elements 101-1~101-6 for generating the clock pulses, which are arranged at half of the pitch of the clock pattern 81 formed on the sheet 11 outside the data record areas, and a pair of light receiving elements 102-1, 102-2 for detecting the tracking error, said elements 102-1, 102-2 being extended in the sheet moving direction over plural clock pattern bits.

At first, the bimorphs 97a, 97b are driven in accordance with the difference in output signals between the tracking light receiving elements 102-1, 102-2 to position the photodetector 99 such that the eighteen light receiving elements 100 can simultaneously detect the positioning lines 82. Then, the sheet 11 is fed under the tracking control based on the difference between the output signals from the light receiving elements 102-1 and 102-2, and the information bits recorded in the record areas are read out by means of the light receiving elements 100 in synchronism with the clock pulses which are generated in accordance with the difference between the sum of output signals from the elements 101-1, 101-3, 101-5 and that from the elements 101-2, 101-4, 101-6. Thus the information read out is compared with the original information to check whether the recording has been carried out correctly or not.

After confirming that the recording has been carried out correctly, to the sheet 11 is applied the card substrate with the opaque layer, and then the sheet is cut into respective optical cards.

In the above embodiment, a plurality of optical cards are formed from the single sheet 11, but according to the invention, a single optical card may be formed from a single sheet. Further, the optical card may include a single record area instead of two record areas. Moreover, the optical card may have a track construction other than that shown in FIG. 7. In the above embodiment, a number of optical fibers are arranged in two arrays, but they may be arranged in a single array or in more than two arrays. As the case may be, optical fibers may be arranged in the track direction. In the above embodiment, the exit end of the optical fiber is inserted into the square opening, but it may be inserted into a circular opening. Further, the exit ends of optical fibers may be secured to the holding member without forming the openings in the holding member. For instance, as shown in FIG. 21, use is made of a transparent glass plate 110 as the holding member, and a mask 113 having square or circular openings 112 is applied to the glass substrate. Exit ends of optical fibers 111 can be secured to the mask 113 by means of an adhesive agent at the openings 112. As illustrated in FIG. 22, in the case of using the mask 113 having the openings 112 whose pitch is 10 μm, two arrays of optical fibers 111, each having a diameter of 20 μm can be clamped between holding members 114. In this case, when the size of the opening 112 is increased, it is possible to form the record bits such that recorded bits 115 having a low reflectivity are larger than record bits 116 having a high reflectivity as shown in FIG. 23. By using such large openings, the read out error can be reduced. Moreover, when the optical fibers 111 are arranged as shown in FIG. 24 and the size of the openings 112 is reduced, it is possible to manufacture the optical card having the bits recorded with a pitch of 5 μm with the aid of the optical fibers 111 having a diameter of 20 μm.

FIG. 22 shows another embodiment of the coupling for securing the incident ends of optical fibers. In this embodiment, a reflecting portion 72a is formed on the inner surface of the coupling 72 at such a position that a part of the light flux emitted from the semiconductor laser 73 and collimated by the lens 74 is made incident upon the reflecting portion 72a. A light flux reflected by the portion 72a is made incident upon a light receiving element 118. By suitably processing the output signal of the light receiving element 118, it is possible to detect the malfunction of the semiconductor laser 73 and to adjust the intensity of the output light beam emitted from the semiconductor laser.

In the above explained embodiment, each of the optical fibers 111 corresponded to respective semiconductor lasers 73, but use may be made of an integrated light emitting laser 120 as shown in FIG. 26. In this case, a number of laser elements are integrally formed in a plate-like substrate and an image of the substrate plane is formed by a lens 121 on incident end faces of optical fibers 122. That is to say, the incident ends of the fibers are arranged in accordance with the array of the semiconductor laser element on the substrate 120. The exit ends of optical fibers 122 are aligned in one or more arrays. In the checking means shown in FIG. 18, the light source 92 and lens 93 are aligned in the slit 94, but the light source may be arranged to emit the light horizontally and a reflection mirror may be arranged underneath the slit 94.

In the optical card of ROM type explained, thus far the data recorded in the single data area is common to all the cards, but when the card is used as a personal identification card for certifying the person in a company, personal data such as name, code number, height, weight, personal address, personal phone number, etc. has to be recorded on the card in addition to common data such as company name, company address, company phone number and so on. In the case of manufacturing such cards for personal use, both the common data and the personal data specific to respective cards have to be recorded on the cards. In the known optical card manufacturing method using the single mask, it is necessary to form the mask in which the above mentioned common and personal data are recorded for respective cards. That is to say, a mask for manufacturing a card could not be used for forming another card. This results in that the cost of manufacturing the cards is extremely increased. Also, from the view point of manufacturing technique, it would be practically impossible to form a card with the aid of two kinds of masks, one for common data and the other for personal data.

The present invention also relates to an optical card which contains the common data and personal data specific to respective cards and can be manufactured at a low cost. To this end, an optical card according to the invention comprises a first data record area in which a first kind of data common to all optical cards is recorded, and a second data record area in which a second kind of data specific to respective cards is recorded, said first and second data record areas being separated from each other.

FIGS. 27A, 27B and 27C show an embodiment of the optical card according to the present invention. On a front surface 138 there are provided a common data record area 131 and a personal data record area 132. In the present embodiment, there is further provided a visual data display area 133 on which a visual data such as a photograph is provided. On the front surface 138 there is further recorded a position detecting mark 134 by means of which a position of the card set in a card reader can be detected. There are further provided seek portions 135a, 135b and 136a, 136b adjacent to the common data record area 131 and personal data record area 132, respectively. As illustrated in FIG. 27C, on a rear surface 139 is provided an information writing sheet 137 such as heat sensitive paper and magnetic sheet. FIG. 27B is a cross section cut along a line X—X in FIG. 27A.

FIG. 28 is a schematic view showing a first embodiment of the method of recording the common data in the common data record area. In this embodiment, a sheet 141 is exposed, via a mask 140, with the aid of a parallel light flux. In the mask 140 there are formed a common data pattern 140a and a position detecting mark pattern 140b. FIG. 29 is a cross sectional view illustrating how to effect the exposure The sheet 141 comprises a transparent substrate 142, a metal reflecting layer 143 made of aluminum and a photosensitive layer 144. The mark 140 is brought into contact with the photosensitive layer 144 and the parallel light is made incident upon the layer through the mask 140. In this manner, the common data can be recorded on a number of optical cards by using the same common mask 140. Then the personal data is recorded on respective optical cards.

FIG. 30 is a schematic perspective view showing the manner of recording the personal data on the optical card. A mask 145 has a personal data recording slit 146 and a personal data mask 147 bearing a number of personal data patterns is slid in recesses formed in the mask 145 such that the personal data patterns on the mask 147 are passed through the slit 146 successively. When a given personal data pattern is positioned at the slit 146, the parallel light is made incident upon the sheet 141 to record the personal data in the personal data record area on the optical card. In this case, the mask 145 is brought into contact with the sheet 141. Since the mask 147 includes a number of personal data patterns, even if the mask is expensive, the cost of respective optical cards can be reduced to a great extent. When it is required to keep the secret of the content of the personal data, the track number may be recorded such that the track number could not be read out by means of usual card readers or a secret number may be recorded on the optical card. Further, if the format of reading the personal data is recorded in the common data record area, an amount of the personal data may be increased or a size of the personal data record area may be decreased. The latter results in the reduction in the cost of the optical card.

When several different kinds of the common data are to be recorded on the optical cards, use may be advantageously made of a mask 148 shown in FIG. 31. In this case, the mask 148 has an opening 149 and a common data mask 152 is slid along recesses 148a formed in the mark 148. After the common data mask 152 has been positioned with respect to the opening 149 of the mask 148, the parallel light flux is made incident upon a sheet 150 via the opening. In this manner, the common data can be recorded at a low cost. In order to position the common data mask 151 with respect to the opening 149 of the mask 148, black or white lines 151a are recorded on the mask 151 at positions between successive data patterns Usually the cost of manufacturing the data mask depends upon its size, and when the common data mask 151 is formed in the manner explained above, the cost can be decreased It should be noted that respective common data patterns in the mask may be separated from each other and the data may be recorded with the aid of the thus separated data masks.

After the common data and personal data have been successively recorded on the sheet, the photosensitive layer 144 is developed and the exposed portions thereof are removed as illustrated in FIG. 32A. Then, portions of the metal layer 143 are selectively removed by means of etching and the remaining photosensitive layer 144 is removed as shown in FIG. 32B. FIG. 32C depicts the sheet 141 after being processed in the manner explained above.

In order to record a personal visual data such as a photograph of a user, as shown in FIG. 30, an opening 152 is formed in the mask 145 and a negative film of the user is placed in this opening. Then the image in the negative film is printed on the sheet 141.

After the common data, personal data and visual data have been recorded on the sheet 141, a card substrate 154 having an opaque layer 153 applied thereon is adhered onto the metal layer 143 as shown in FIG. 33. Further, the record sheet 137 (see FIG. 27C) may be applied on the rear surface 139 of the optical card 141. On the record sheet 137 there may be recorded visible data. For instance, in case of using the heat sensitive sheet, a thermal head is installed in the card reader and desired data may be recorded with the aid of the thermal head while the track number, clock patterns, etc. are read out of the optical card. It should be noted that a heat sensitive recording layer having a thickness of several microns may be directly applied on the rear surface of the optical card. In such a case, the card substrate 154 should be made of chemically non-reactive material such as polyethyrene, polypropyrene and polyester.

FIG. 34 shows another embodiment of the method of manufacturing the optical card according to the invention. In the present embodiment, instead of recording the personal data by exposing the photosensitive layer via the mask bearing the personal data pattern, the photosensitive layer is exposed by a number of light sources via optical fibers, said light sources being modulated in accordance with the personal data to be recorded.

FIG. 35 is a plan view showing the exit end face of the optical fiber bundle. Fifteen optical fibers 155 are arranged in two rows and a mask 156 having square openings is arranged at the exit end faces of the optical fibers. At the incident end faces of the optical fibers 155 are arranged semiconductor lasers 158 which are controlled by a controller 157. The controller 157 controls the semiconductor lasers 158 in accordance with the personal data to be recorded, and laser light beams modulated in accordance with the personal data are transmitted through the optical fibers 155 and are made incident upon the optical card 141 via the slit 146 formed in the mask 145. The exit ends of the optical fibers 155 are secured to a head 159 which is moved in the direction of the slit 146 by means of motor 160, lead screw 161 connected to the motor and guide rod 162. By moving the head 159 in the slit direction, the personal data is recorded in the personal data record area of the optical card. The image of the photograph 166 of the user is projected onto the optical card 141 by means of a lens 165 via the opening 152 formed in the mask 145.

As explained above, in the embodiments shown in FIGS. 27 to 35, the common data and personal data specific to respective optical cards can be recorded on a single optical card in the separate data record areas by using the common mask bearing the common data pattern, so that the cost of the optical card can be reduced to a large extent.

In the embodiments so far explained, the laser light beams emitted from the semiconductor laser diodes are made incident upon the optical card via the optical fibers. Therefore, the construction of the recording apparatus is rather complicated and expensive. The present invention further provides the recording apparatus which can be constructed in a simple and less expensive manner. To this end, use is made of a thin film electroluminescent element array, and the array and optical card are moved relative to each other in a direction perpendicular to the array direction. Each element of the thin film electroluminescent element array are selectively driven in accordance with the data signals to be recorded.

The thin film electroluminescent element array per se is known and has been developed by Westinghouse company, United States. Hereinafter the thin film electroluminescent element is termed TFEL for the sake of simplicity.

The TFEL array comprises a semiconductor substrate, e.g. a zinc sulphide substrate, a common electrode applied on one surface of the substrate, and a number of driving electrodes corresponding to respective elements applied on the other surface of the substrate. By applying a voltage across the common electrode and a driving electrode via a switching circuit, a very strong light beam is emitted from an end surface of the substrate at a position where the relevant driving electrode is formed. Therefore, by selectively energizing the driving electrodes in accordance with the data to be recorded, it is possible to record the data signal on the optical card. By using the TFEL array, the whole construction of the recording apparatus can be made compact and small in comparison with the apparatus which uses the semiconductor laser diodes and optical fibers.

Figure 36:
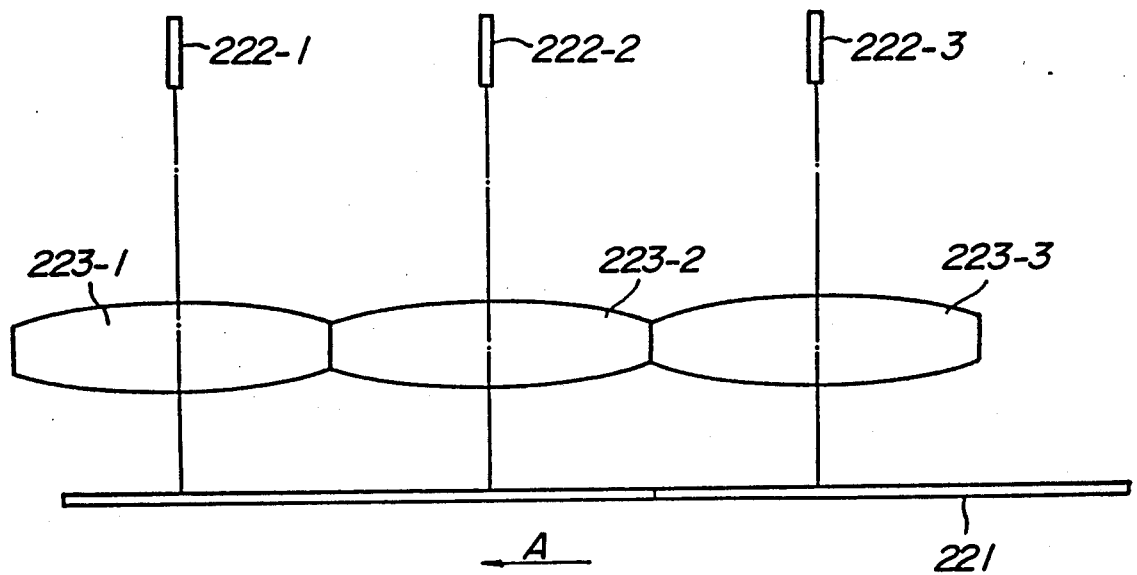
FIGS. 36 and 37 are side and plan views, respectively showing another embodiment of the recording apparatus according to the invention.
Figure 37:
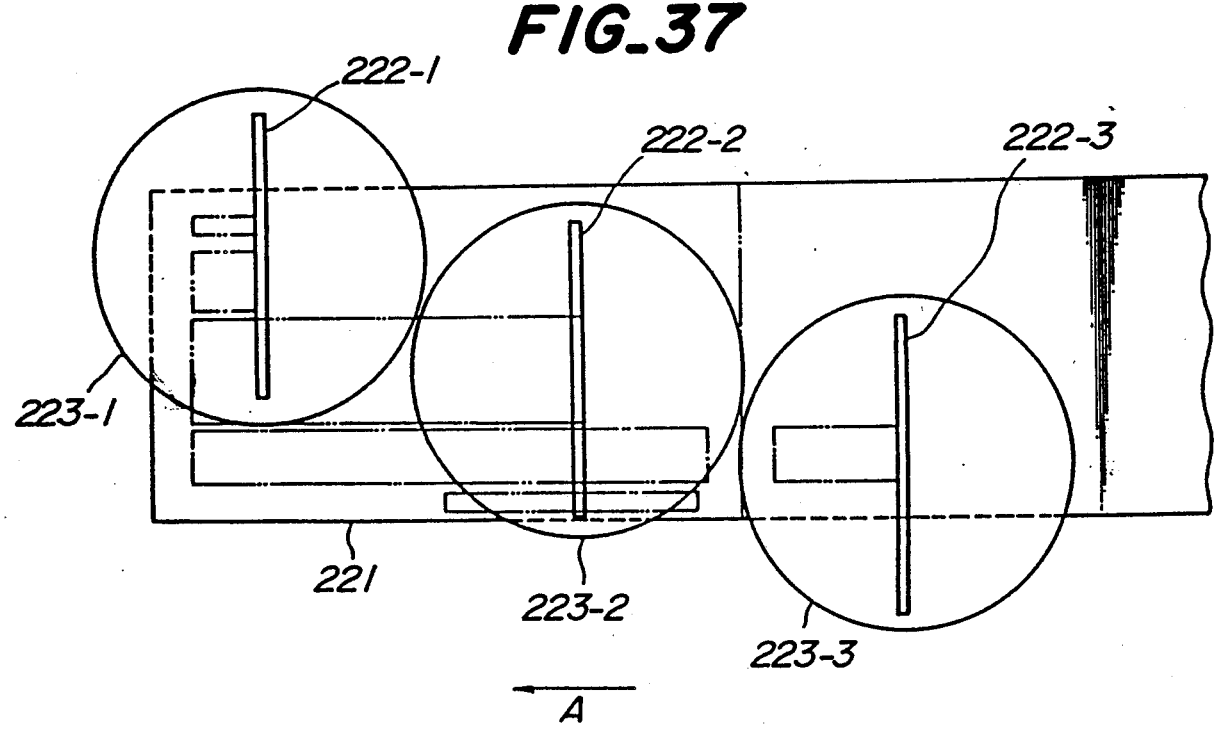

FIGS. 36 and 37 are front and plan views, respectively, showing an embodiment of the recording apparatus including the TFEL array according to the invention for recording the data on a sheet 221 having a photosensitive layer. The sheet 221 has a width equal to that of the optical card which is the same as that illustrated in FIGS. 6 and 7. The sheet is unwound from a sheet roll and is fed in a direction shown by an arrow A which is parallel with the longitudinal direction of the card. The sheet has to be fed in a flat configuration at a constant speed. In the present embodiment, there are arranged three TFEL arrays 222-1 to 222-3 which are extended in a direction perpendicular to the direction A in such a manner that they divide the width of the card into three sections of equal width. While the sheet 221 is moved at constant speed, the TFEL elements of the arrays 222-1 to 222-3 are selectively driven in accordance with the data to be recorded and light beams emitted from the elements are made simultaneously incident upon corresponding record blocks of the card by means of lenses 223-1 to 223-3. FIG. 38 is a perspective view illustrating the construction of the TFEL array 222. The array comprises a semiconductor substrate 225 and a number of TFEL elements 226-1 to 226-n which are formed at positions corresponding to data record positions on the card and are aligned in the width direction of the card. That is to say, at a position corresponding to the data track, there are arranged a center element 227 for recording the clock pattern 32 (see FIG. 7), and two sets of eight elements 228-1 to 228-16 each arranged on respective sides of the center element and recording the data including the track number pattern, track identifying pattern and frame number pattern.

As shown in FIG. 38, one electrode of the elements is connected to a common electrode 231 and a voltage supply source 233 is connectable across the common electrode and driving electrodes of respective elements via switches 232-1 to 232-n. By controlling the switches in accordance with the data to be recorded, light beams are selectively emitted from end surfaces of respective elements and are made incident upon the sheet 221 by means of the lenses 223-1 to expose the sheet as shown in FIG. 40, in which hatched areas denote the recorded bits.

After the sheet 221 is exposed in the manner mentioned above, the sheet is developed, and then the recording condition is checked. FIG. 41 is a perspective view showing an embodiment of the checking apparatus. The checking apparatus comprises a TFEL light source having a linear light emitting end face, i.e. a thin film semiconductor light emitting element 235, a projection lens 236 for projecting the light onto the sheet 221 from an inclined direction to form an elongated light spot extending in the width direction of the card, an imaging lens 237 for forming an image of an illuminated portion of the sheet, and a photodetector 238 having light receiving elements arranged in a direction corresponding to the width direction of the card. The photodetector 238 may be composed of CCD. By suitably processing the output signal supplied from the photodetector 238 it is possible to check the condition of the recorded data.

After the checking, the sheet 221 is divided into respective optical cards, and the card substrate is applied onto the card as has been described above. In this manner, it is possible to manufacture the optical card having the exposed portion (black) of low reflectivity and the non-exposed portion of high reflectivity (white) as shown in FIG. 6. It should be noted that the check of the record may be conducted after the card substrate is applied to the sheet.

In the above explained embodiment, a plurality of TFEL arrays are arranged in the width direction of the card corresponding to the record blocks, but it is also possible to arrange plural TFEL arrays 241 and 242 as shown in FIG. 42 such that elements 241-N of the array 241 are not aligned with elements 242-N of the array 242 viewed in the feeding direction A of the sheet. When such TFEL arrays are used, it is possible to reduce the influence of the flare during the reading of the optical card, because there is not remained a high reflective portion between adjacent exposed data bits aligned in the width direction of the optical card. In this connection it should be noted that TFEL elements of the arrays 241 and 242 are advantageously as partially viewed in the card feeding direction A.

Figure 43:
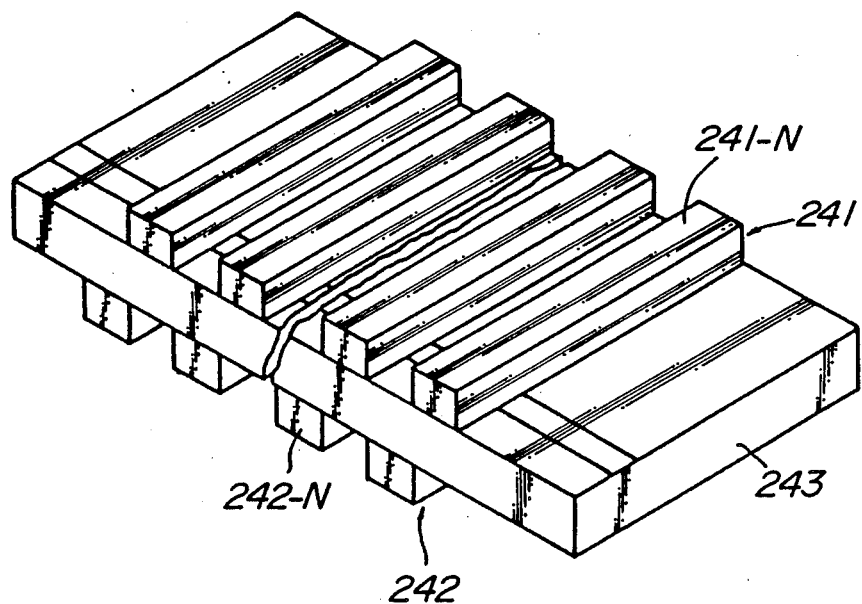
FIGS. 43 and 44 are perspective and front views, respectively, representing two embodiments of the TFEL element array.
Figure 44:
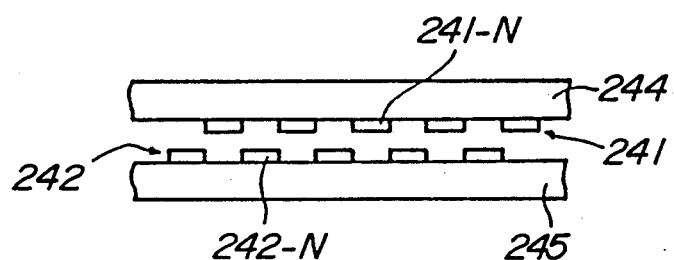

The above mentioned TFEL arrays 241 and 242 may be formed on opposite surfaces of a substrate 243 as illustrated in FIG. 43 or may be provided on opposite surfaces of separate substrates 244 and 245. By constructing the TFEL arrays as shown in these figures, a distance between adjacent elements can be increased so that the arrays can be manufactured easily, and further, a contact surface area between each element and the common electrode can be simply made larger so that the intensity of the emitted light can be increased.

Figure 45:
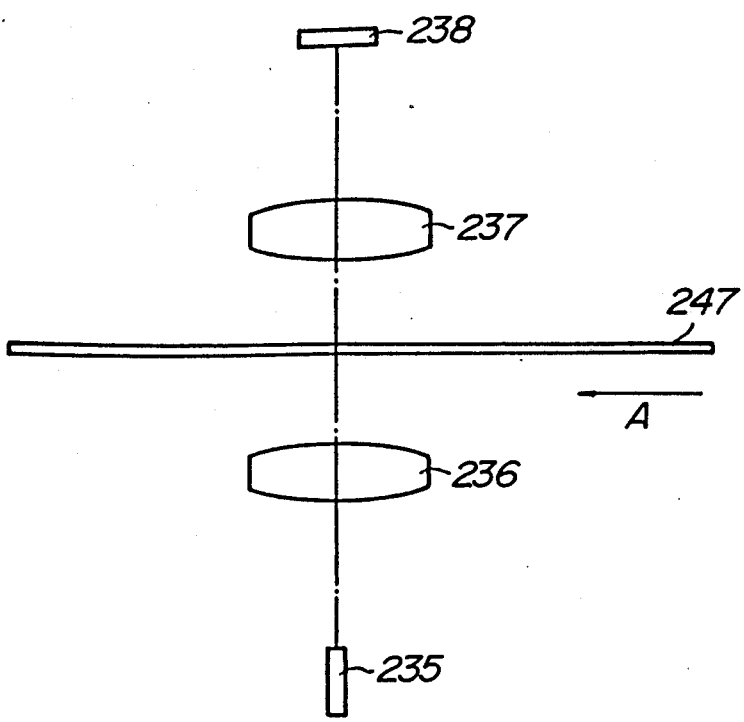
FIGS. 45 and 46 show an embodiment for checking a mask for use in manufacturing the optical card.
Figure 46:
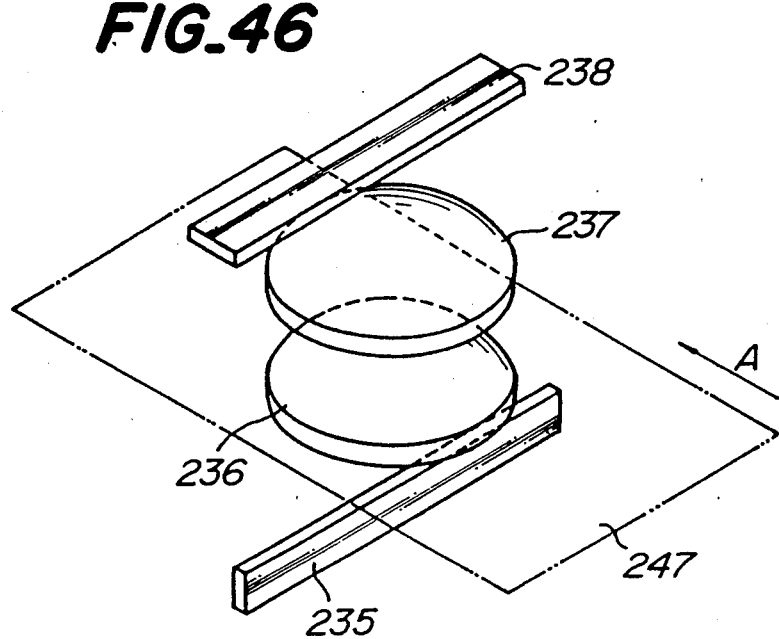

The present invention is not limited to the embodiments so far explained, but may be modified in various ways. For instance, in the above embodiment the TFEL array is utilized to manufacture the optical card, but it may be equally applied to the formation of the mask bearing the data pattern to be recorded on the optical card. In this case, the manufactured mask may be checked by means of a checking apparatus shown in FIGS. 45 and 46. The checking apparatus comprises a TFEL light source 235, a projecting lens 236 for projecting the elongated light beam upon the mask 247, an imaging lens 237 for forming an image of an illuminated portion of the mask and a linear image sensor comprising CCD 238 for receiving the image. The elongated light spot is extended in the width direction of the mask 247 which is perpendicular to the feeding direction A.

In the embodiments so far explained, the optical cards are all ROM type in which all the data has been recorded previously, but the present invention also relates to the optical card of read-after-write type in which the data can be recorded afterward. In a known method of recording the data onto the optical card, there is arranged a single laser light source and the laser light emitted from the light source and modulated in accordance with the data to be recorded is made incident upon the optical card by means of a scanning device such as a mirror which is swung by a bimorph. Since the scanning device is complicated and expensive, the whole recording apparatus is liable to be also complicated and expensive. Moreover, the semiconductor laser diode has to be controlled in synchronism with the scanning position in the direction perpendicular to the track direction, so that the construction of the laser diode control circuit becomes also complicated.

In a data recording apparatus according to the invention which will be explained hereinbelow, use is made of the TFEL array.

Figure 47:
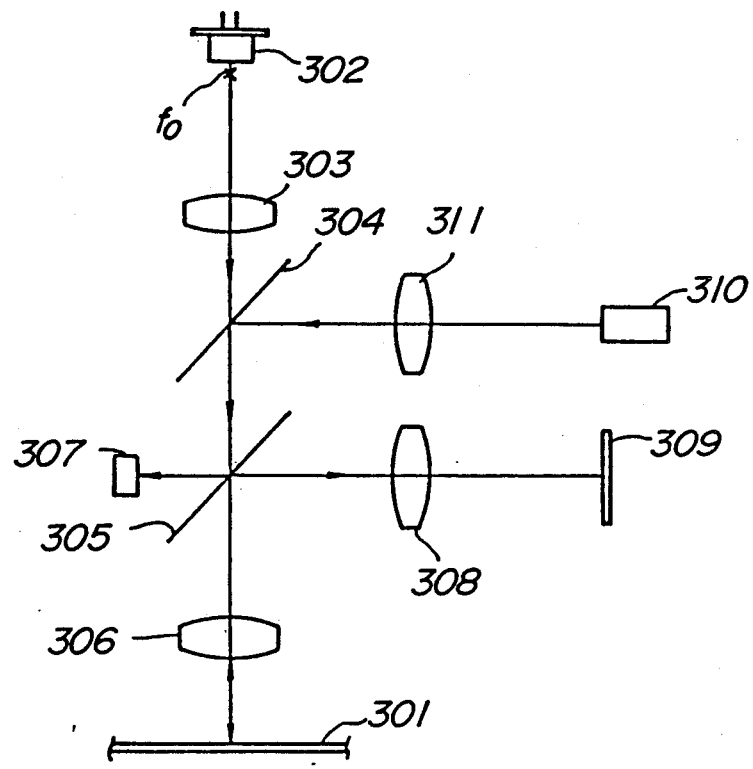
FIG. 47 is a schematic view illustrating an embodiment of the data recording apparatus according to the invention.

FIG. 47 is a schematic view showing an embodiment of the method of recording the data according to the invention. In this embodiment, a light beam is made incident upon the optical card 301 perpendicularly to the surface of the card. A light emitting diode LED 302 is arranged slightly behind a focal point $f_0$ of a collimator lens 303. A light beam emitted from the LED 302 is made incident upon the card 301 by means of collimator lens 303, mirror 304, half mirror 305 and objective lens 306 in a defocused condition so that the card is illuminated uniformly. A part of the light beam reflected by the half mirror 305 is received by a photodetector 307 whose output signal is used to control or keep the intensity of the light emitted from the LED 302 constant.

Light reflected from the optical card 301 is collected by the objective lens 306 and is made incident upon the half mirror 305. Light reflected by the half mirror 305 is made incident upon a photodetector 309 via a lens 308 which forms an image of the illuminated portion of the optical card.

A TFEL array 310 serving as a recording light source is placed at a focal point of a collimator lens 311 and a light beam emitted from the TFEL array 310 is made incident upon the optical card 301 by means of the collimator lens 311, mirror 304, half mirror 305 and objective lens 306. It should be noted that the mirror 304 is formed by a dichroic mirror which transmits the light (wavelength of about 880 nm) from the LED 302, but reflects the light (wavelength of about 585 nm) from the TFEL array 310.

Figure 48:
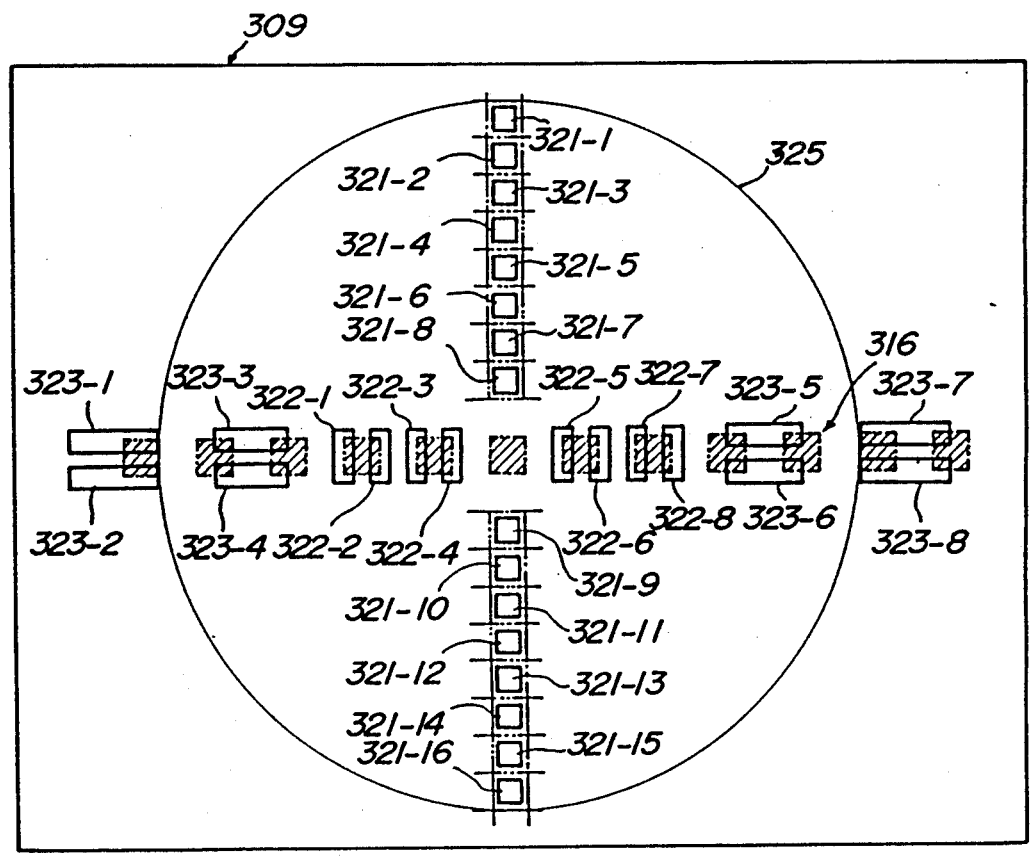
FIG. 48 is a plan view depicting the photodetector shown in FIG. 47.

FIG. 48 is a plan view showing an embodiment of the photodetector 309 illustrated in FIG. 47. The photodetector 309 comprises sixteen light receiving elements 321-1 to 321-16 arranged to receive the image of the sixteen data bits aligned in the width direction of the optical card, four pairs of light receiving elements 322-1 to 322-8 for receiving the image of the clock pattern 32 (see FIG. 7) to generate the clock pulses, and four pairs of light receiving elements 323-1 to 323-8 for receiving the image of the clock pattern to generate focusing and tracking errors. The light receiving elements 322-1 to 322-16 are arranged such that the clock pulses are derived from a difference between a sum of output signals from odd numbered elements 322-1, 322-3, 322-5, 322-7 and a sum of output signals from even numbered elements 322-2, 322-4, 322-6, 322-8. The light receiving elements 323-1 to 323-8 are arranged on both sides of a center line passing through the clock pattern such that the tracking error signal is derived from a difference between a sum of output signals from elements 323-1, 323-3, 323-5, 323-7 and a sum of output signals from elements 323-2, 323-4, 323-6, 323-8, and the focusing error signal is obtained from a difference between a sum of output signals from elements 323-3, 323-4, 323 5, 323-6 and a sum of output signals from elements 323-1, 323-2, 323-7, 323-8.

Figure 49:
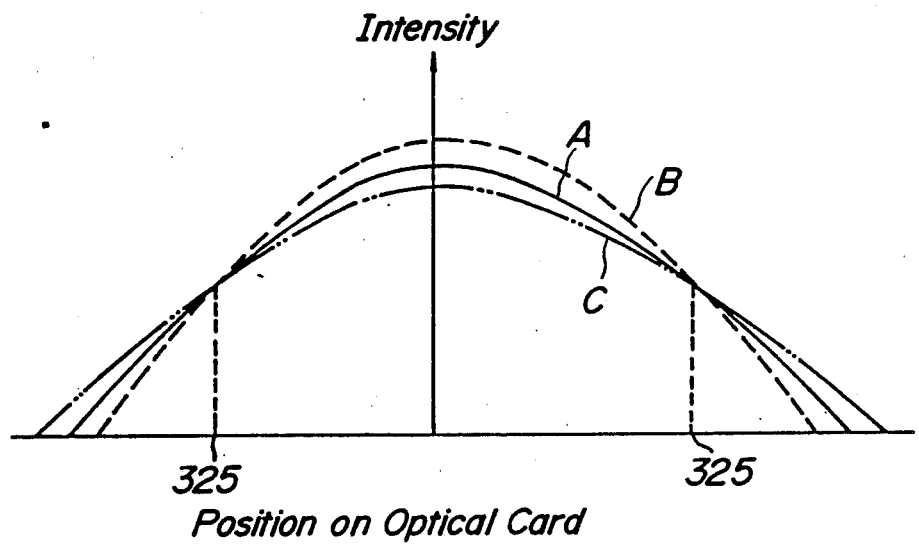
FIG. 49 is a graph representing the intensity distribution of the light beam.

As explained above, the LED 302 is arranged at the position slightly behind the focal point $f_0$ of the lens 303 and the optical card 301 is illuminated by the defocused light beam. Therefore, the illuminating light beam is focused at a position near the objective lens 306 with respect to the focal point of the objective lens. When the focal point of the objective lens 306 is in an in-focused position, the illumination light on the optical card 301 has the distribution shown by a solid curve A in FIG. 49. When the optical card is moved toward the objective lens 306, the distribution of the illumination light is changed as depicted by a dotted curve B, and when the optical card is moved away from the objective lens, the distribution is changed as illustrated by a chain curve C. In this manner, the distribution of the illuminating light is changed in accordance with the distance between the optical card and the objective lens. As shown in FIG. 49, in the distribution of the illuminating light there is a ring-shaped stationary portion (in FIG. 48 this portion is denoted by a circle 325) at which the distribution is not substantially changed regardless of the variation in the distance between the optical card and the objective lens. With respect to the stationary portion 325, the direction of the variation of the distribution of the illuminating light is reversed. That is to say, when the optical card is moved closer to the objective lens 306, in the region inside the stationary portion, the intensity is increased, but in the region outside the stationary portion, the intensity is decreased. In contrast, when the optical card is moved away from the focal point of the objective lens, the intensities of the illuminating light beams within and outside the stationary portion are changed in the opposite manner to each other. As shown in FIG. 48, the light receiving elements 321-1 to 321-16, 322-1 to 322-8 and 323-3 to 323 6 are arranged within the stationary portion 325, and the elements 323-1, 323 2, 323-7 and 323-8 are arranged outside the stationary portion. Therefore, by comparing the sum of the output signals from the elements 323-3 to 323-6 with the sum of the output signals from the elements 323-1, 323-2, 323-7, 323-8, there may be derived the focusing signal.

It should be noted that the construction of the TFEL array 310 is entirely the same as that shown in FIG. 38, so that the explanation thereof is omitted here.

In the present embodiment, the optical card 301 and the optical system including the LED 302, lenses 303, 306, 308 and 311, mirrors 304, 305, photodetectors 307, 309, and TFEL 310 are moved relative to each other in the track direction, and the clock pulses are derived from the output signals 322-1 to 322-8 and the focusing and tracking errors are derived from the output signals from the elements 323-1 to 323-8. By utilizing the focusing error signal, the objective lens 306 is moved in its optical axis direction into the in-focused condition, and by means of the tracking error signal, the tracking servo is carried out such that the light spot follows the data track on the optical card. While the above mentioned control is effected, the TFEL array 310 is energized in accordance with the data signal to be recorded to modulate the intensity of the light beams. The thus modulated light beams are simultaneously made incident upon the optical card 301 to record the data signal of sixteen bits simultaneously.

Figure 50:
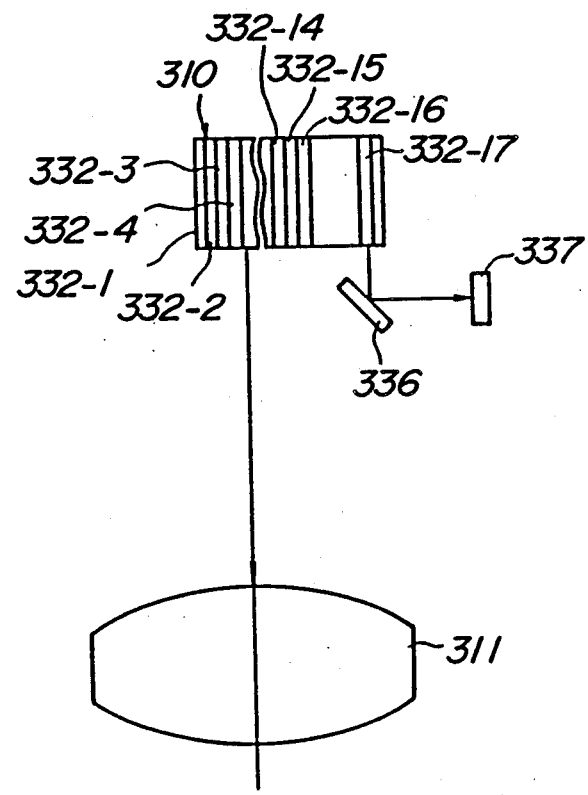
FIG. 50 is a schematic view showing another embodiment of the data recording apparatus according to the invention.

The present invention is not limited to the embodiments explained above, but many alternations and modifications may be conceived by those skilled in the art within the scope of the invention. As shown in FIG. 50, an element 332-17 is provided in addition to the elements 332-1 to 332-16 for recording the data, and the element 332-17 is kept driven during the recording. An output light beam from the element 332-17 is made incident upon a photodetector 337 via a mirror 336 to monitor the light intensity. By controlling the TFEL array 310 in accordance with the output signal from the element 332-17, the light intensity of the elements 332-1 to 332-16 can be remained constant. Further, the number of data bits which are recorded simultaneously may be different from sixteen, and may be set to any desired number. In the above embodiment, the data recording light is made incident upon the optical card perpendicularly thereto, but may be impinged on the optical card from an inclined direction. As explained above, according to the invention, the scanning device can be dispensed with by utilizing the TFEL array as the light source and the control circuit for the TFEL array can be made simple and compact. Therefore, the whole recording apparatus can be constructed in a simple and cheap manner in comparison to the known apparatus using the scanning device.

What is claimed is:

1. In a method of manufacturing an optical card having a transparent base, a first optical member applied on the base and having a first reflectivity, and a photosensitive layer applied on the first optical member by exposing the photosensitive layer with light modulated in accordance with a data signal to be recorded, removing selectively the first optical member with the aid of the exposed photosensitive layer, and applying on the first optical member a second optical member having a second reflectivity different from the first reflectivity, the improvement being characterized in that:
   said photosensitive layer is simultaneously exposed with a plurality of light beams emitted from a plurality of light sources and modulated in accordance with the data signal by means of a plurality of optical fibers.

2. A method according to claim 1, wherein the light beams are made incident upon the photosensitive layer by means of a mask having a plurality of openings of a given shape.

3. A method according to claim 1, wherein exit ends of the optical fibers are aligned in a width direction of the optical card which is perpendicular to a longitudinal direction of the optical card.

4. A method according to claim 1, wherein the light sources are driven intermittently in synchronism with a stepwise movement of the optical card.

5. A method according to claim 1, wherein after recording the data signal, the condition of recorded bits is checked by reading the bits optically.

6. An apparatus for manufacturing an optical card from a sheet of a dimension at least equal to the optical card and having a transparent base, a metal layer applied on the base and having a high reflectivity, and a photosensitive layer applied on the metal layer, comprising:
   a shuttle for receiving the sheet in a flat form;
   shuttle driving means for moving the shuttle in a direction parallel to a longitudinal direction of the optical card;
   a plurality of semiconductor laser diodes;
   a laser driving means for selectively driving the semiconductor laser diodes in accordance with a data signal to be recorded on the optical card;
   a plurality of optical fibers having incident ends faced to receive light beams emitted from the semiconductor laser diodes and exit ends aligned in a width direction perpendicular to the longitudinal direction; and a holder means for supporting the exit ends of optical fibers and making incident the light beams emanating from the exit ends of optical fibers upon the photosensitive layer of the sheet to record the data bit.

7. An apparatus according to claim 6, wherein the shuttle includes a position detecting mark applied thereon, and the apparatus further comprises a detector for detecting the position detecting mark to derive a position signal, whereby said shuttle driving means and laser driving means are controlled in accordance with said position signal.

8. An apparatus according to claim 6, wherein said holder means comprises a supporting member having a plurality of holes in which the exit ends of optical fibers are clamped, a cross sectional configuration of said holes being corresponded to a shape of the data bits recorded on the sheet.

9. An apparatus according to claim 6, wherein said holder means is constructed such that at least two arrays of the exit ends of optical fibers are arranged in the width direction.

10. A method of manufacturing an optical card having a transparent base, a first optical member applied on the base and having a first reflectivity, and a photosensitive layer applied on the first optical member by exposing the photosensitive layer with light modulated in accordance with a data signal to be recorded, selectively removing the first optical member with the aid of the exposed photosensitive layer, and applying on the first optical member a second optical member having a second reflectivity different from the first reflectivity, the improvement being characterized in that;
said photosensitive layer is simultaneously exposed with a plurality of light beams emitted from a thin film electroluminescent element array and modulated in accordance with the data signal, while the optical card is moved in its longitudinal direction.

11. A method according to claim 10, wherein said plurality of light beams are made incident upon the photosensitive layer by means of a projection lens.

12. A method according to claim 10, wherein a data record area of the optical card is divided into a plurality of record blocks viewed in a width direction perpendicular to the longitudinal direction, the data signal is also divided in accordance with the record blocks, and the divided data signals are recorded with the aid of a plurality of thin film electroluminescent element arrays each corresponding to respective record blocks.

13. An apparatus for manufacturing an optical card from a sheet of a dimension at least equal to that of the optical card and having a transparent base, a metal layer applied on the base and having a high reflectivity, and a photosensitive layer applied on the metal layer, comprising:
a sheet driving means for moving the sheet in a width direction parallel to a longitudinal direction of the optical card;
at least one thin film electroluminescent element array;
an array driving means for selectively driving thin film electroluminescent elements of the array in accordance with a data signal to be recorded on the optical card; and
a light projecting lens for making incident a plurality of light beams emitted from the thin film electroluminescent elements upon the photosensitive layer of the sheet to record the data bit.

14. An apparatus according to claim 13, wherein a plurality of thin film electroluminescent element arrays are arranged in the longitudinal direction of the optical card such that thin film electroluminescent elements of the arrays are not as viewed in the longitudinal direction of the card.

15. An apparatus according to claim 14, wherein said plurality of the thin film electroluminescent element arrays are arranged on opposite surfaces of a single substrate.

16. An apparatus according to claim 14, wherein said plurality of the thin film electroluminescent element arrays are arranged on opposing surfaces of a plurality of substrates.

17. In an apparatus for recording a data signal on an optical card having a control pattern extending in a track direction including an illumination device for illuminating the control pattern of the optical card, a photodetector for detecting an image of an illuminated portion of the control pattern of the optical card to derive clock pulse signals, focusing error signals and tracking error signals, a control means for effecting focusing and tracking servo control in accordance with the focusing and tracking error signals, and a recording light source for projecting a recording light beam, modulated in accordance with the data signal to be recorded, onto the optical card to record the data signal, the improvement comprising:
at least one thin film electroluminescent element array for projecting, simultaneously, a plurality of recording light beams aligned in the width direction; and
an array driving means for selectively driving thin film electroluminescent elements of the array in accordance with the data signal to be recorded in synchronism with the clock pulse signal.

18. An apparatus according to claim 17, wherein said thin film electroluminescent element array is extended in the width direction of the optical card.

19. An apparatus according to claim 17, wherein said photodetector includes at least one pair of light receiving elements which are separated in the longitudinal direction of the optical card to derive the clock pulse signal, and at least one pair of light receiving elements which are separated in the width direction of the card to derive the tracking error signal.

20. An apparatus according to claim 19, wherein said photodetector further comprises at least one pair of light receiving elements which are arranged within and outside a circular stationary portion of the image, respectively, to derive the focusing error signal.

21. An apparatus according to claim 17, wherein said thin film electroluminescent element array comprises at least one additional element which is always energized to emit a monitor light beam, and the apparatus further comprises a light receiving element for detecting the monitor light beam to generate a monitor signal and a controller for controlling the intensity of the recording light beams in accordance with the monitor signal.

22. An apparatus for manufacturing an optical card having a transparent base, a first optical member applied on the base and having a first reflectivity, and a photosensitive layer applied on the first optical member by exposing the photosensitive layer with light modulated in accordance with a data signal to be recorded, selectively removing the first optical member with the aid of the exposed photosensitive layer, and applying a second optical member having a second reflectivity different from the first relfectivity on the first optical member, the improvement comprising:

a plurality of light sources for emitting a plurality of light beams modulated in accordance with the data signal to be recorded;

an optical system for projecting simultaneously said plurality of light beams onto the photosensitive layer, said light beams being aligned in a width direction of the optical card perpendicular to a longitudinal direction of the optical card; and a driving means for moving the optical card and the light beams relative to each other in the longitudinal direction of the optical card.

23. An apparatus according to claim 22, wherein said light sources are formed by semiconductor laser diodes, and said optical system is formed by optical fibers having incident ends faced to the laser diodes and exit ends aligned in the width direction of the optical card.

24. An apparatus according to claim 22, wherein said light sources are formed by thin film electroluminescent elements arranged in the width direction of the optical card, and said optical system is formed by a lens for projecting the light beams emitted from the thin film electroluminescent elements onto the optical card.

* * * * *